United States Patent
Takemoto

(10) Patent No.: US 11,070,147 B2
(45) Date of Patent: Jul. 20, 2021

(54) RESONANT INVERTER APPARATUS

(71) Applicant: DENSO CORPORATION, Kariya (JP)

(72) Inventor: Shoichi Takemoto, NIsshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/776,953

(22) Filed: Jan. 30, 2020

(65) Prior Publication Data
US 2020/0252002 A1    Aug. 6, 2020

(30) Foreign Application Priority Data
Jan. 31, 2019  (JP) .............................. JP2019-014993

(51) Int. Cl.
  *H02M 7/48*      (2007.01)
  *H02M 7/537*     (2006.01)
  *H02M 7/5387*    (2007.01)

(52) U.S. Cl.
  CPC ...... *H02M 7/53871* (2013.01); *H02M 7/4826* (2013.01); *H02M 7/537* (2013.01); *H02M 2007/4815* (2013.01)

(58) Field of Classification Search
  CPC ....... H02M 2007/4815; H02M 7/4826; H02M 7/537
  USPC .......................... 363/21.02, 21.03, 95, 97, 98
  See application file for complete search history.

(56) References Cited

U.S. PATENT DOCUMENTS

| | | | | |
|---|---|---|---|---|
| 6,154,379 A | * | 11/2000 | Okita ...................... | H02M 7/48 363/40 |
| 2011/0242854 A1 | * | 10/2011 | Minami .............. | H02M 1/4258 363/17 |
| 2012/0307529 A1 | * | 12/2012 | Chiba ................. | H02M 3/3376 363/17 |
| 2014/0226369 A1 | * | 8/2014 | Kimura ............... | H02M 3/3376 363/21.09 |
| 2016/0020704 A1 | | 1/2016 | Fujita | |
| 2016/0099649 A1 | * | 4/2016 | Hara .................... | H02M 3/3353 363/17 |
| 2016/0248336 A1 | * | 8/2016 | Kamata ................. | H02M 7/537 |
| 2019/0165551 A1 | | 5/2019 | Takemoto | |

FOREIGN PATENT DOCUMENTS

JP    2017-085793    5/2017

* cited by examiner

*Primary Examiner* — Gary A Nash
(74) *Attorney, Agent, or Firm* — Nixon & Vanderhye P.C.

(57) ABSTRACT

A resonant inverter apparatus supplies a high AC voltage to a discharge load. In this apparatus, an inverter circuit converts a DC voltage to an AC voltage using a plurality of switching elements. A transformer steps up the AC voltage and generates a high AC voltage. A DC voltage detecting unit detects a value of a DC voltage supplied to the inverter circuit. A control unit generates a driving pulse for performing on/off switching of the switching elements. The switching elements include first and second switching elements. The control unit performs phase angle control of the driving pulse. In response to the detected value of the DC voltage being greater than a reference value, the control unit sets a switching phase angle of the second switching element relative to the first switching element serving as reference, based on the magnitude of the valued of the DC voltage.

9 Claims, 21 Drawing Sheets

FIG.4
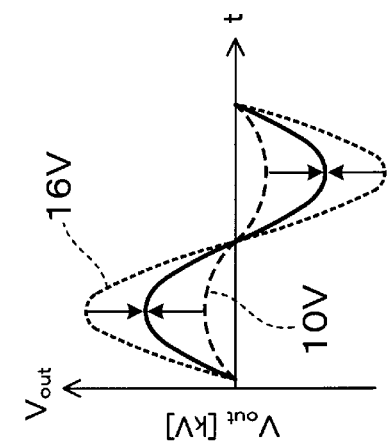
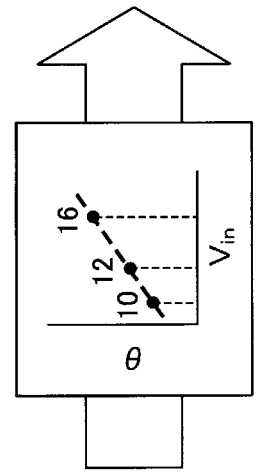
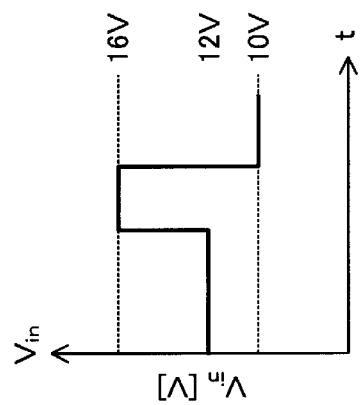

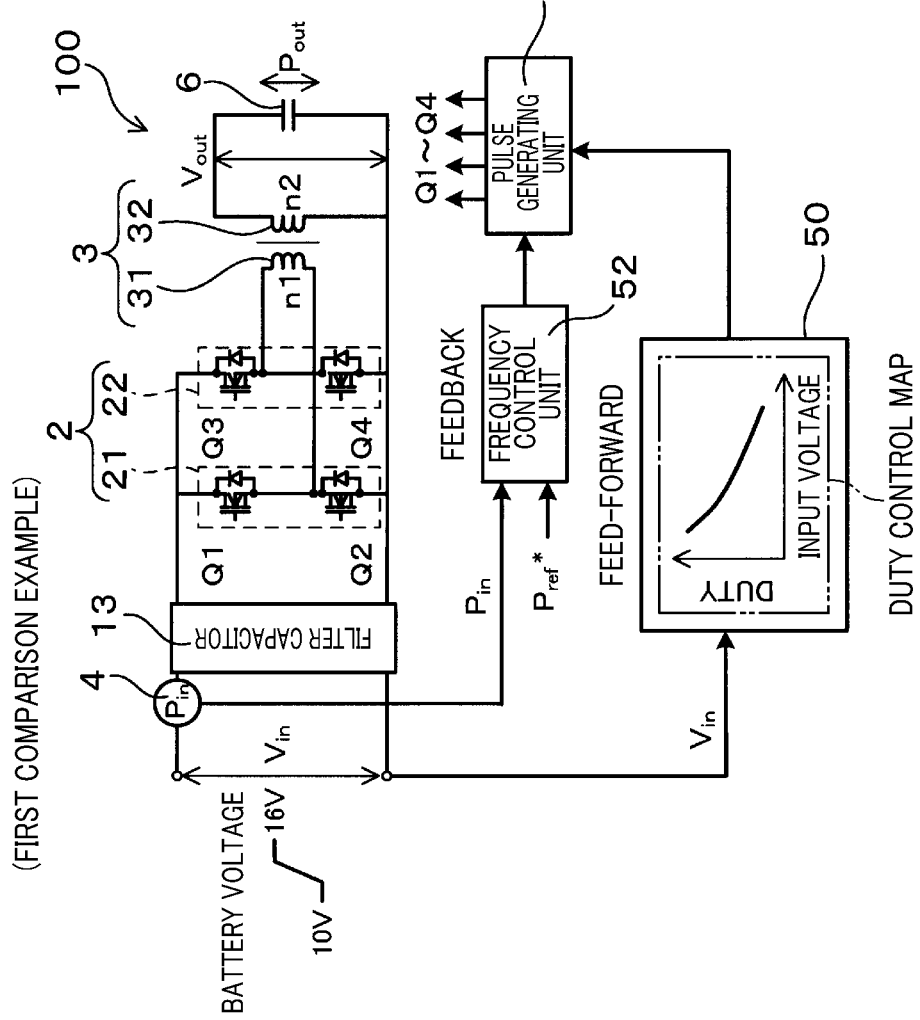
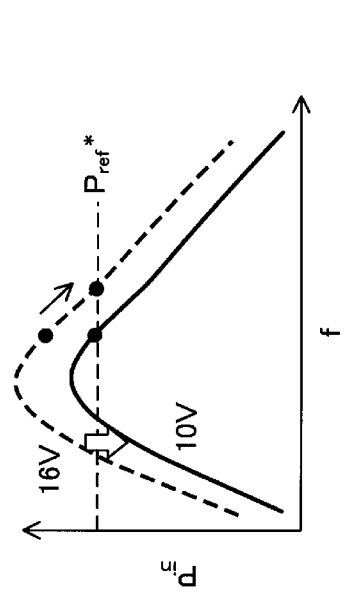
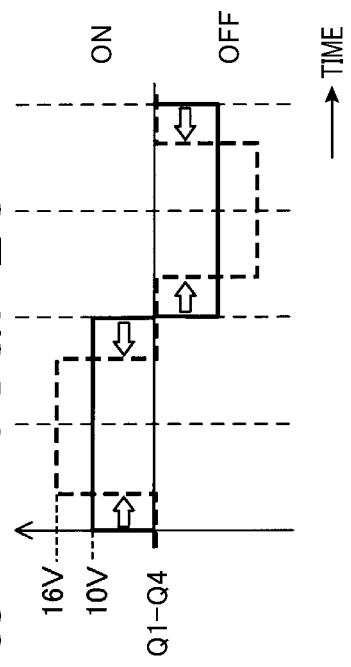
FIG.12A (FIRST COMPARISON EXAMPLE)
FIG.12B
FIG.12C (FIRST EMBODIMENT SW PHASE ANGLE CONTROL PERFORMED)

(FIRST COMPARISON EXAMPLE  SW PHASE ANGLE CONTROL  NOT PERFORMED)

→ TIME

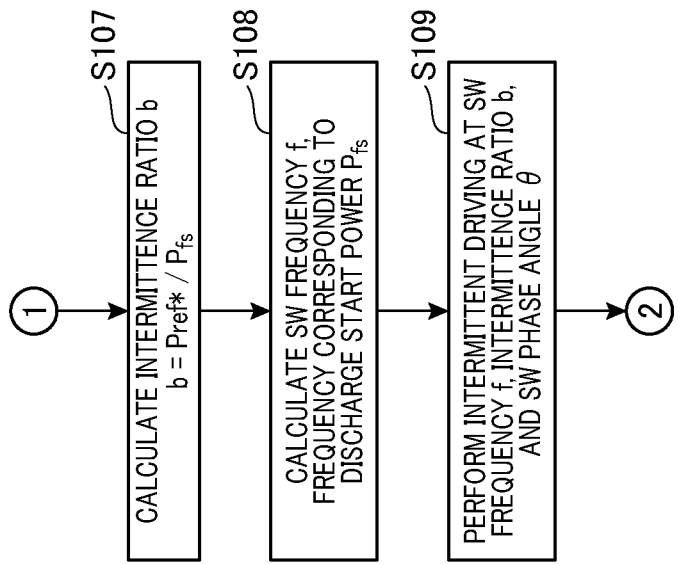
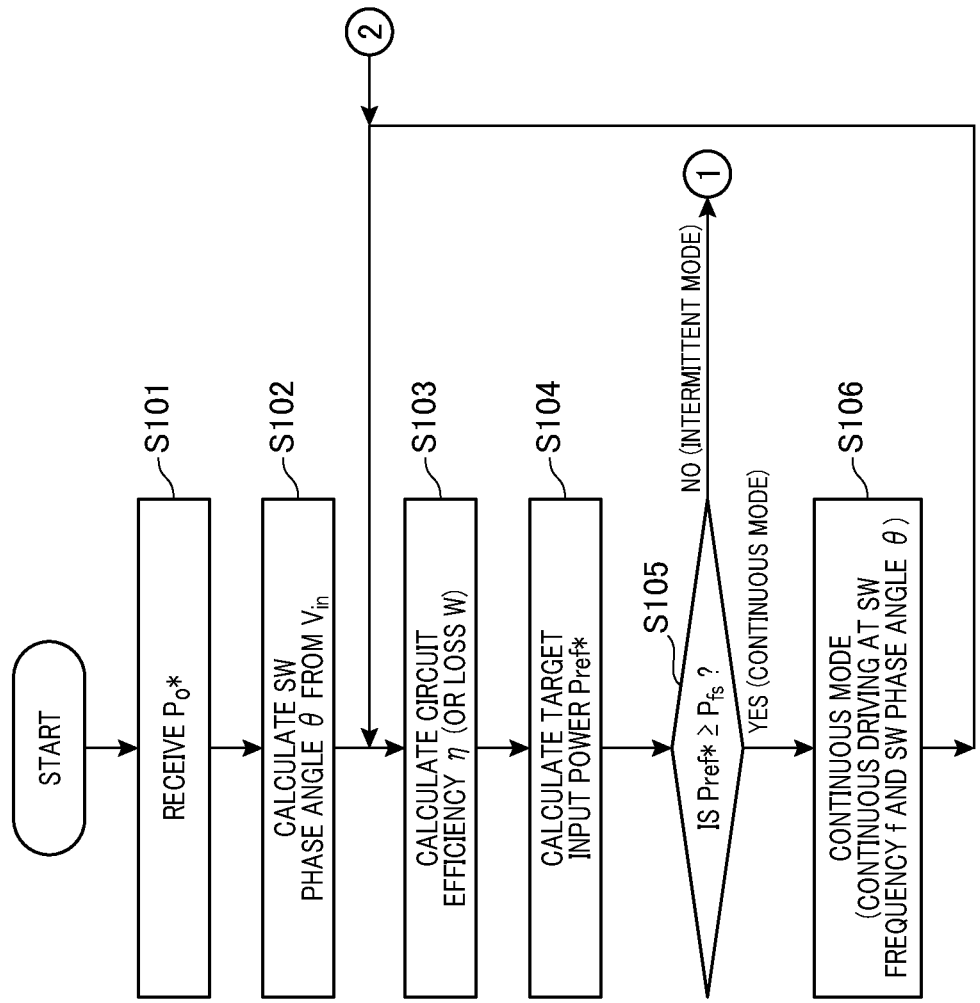

RESONANT INVERTER APPARATUS

CROSS-REFERENCE TO RELATED APPLICATION

This application is based on and claims the benefit of priority from Japanese Patent Application No. 2019-014993, filed Jan. 31, 2019. The entire disclosure of the above application is incorporated herein by reference.

BACKGROUND

Technical Field

The present disclosure relates to a resonant inverter apparatus that enables a discharge load to generate discharge.

Related Art

As an example, a resonant inverter apparatus is used to supply an alternating-current (AC) voltage to a discharge load, such as a discharge generation apparatus, that is mounted in a vehicle. In such applications, the resonant inverter apparatus for a vehicle typically includes an inverter circuit, a transformer, and a control unit. The inverter circuit converts a direct-current (DC) voltage from a battery power supply to an AC voltage. The transformer steps up the AC voltage and outputs the stepped-up AC voltage to the discharge load. The control unit controls output from the inverter circuit to the transformer. In the resonant inverter circuit, stable control of the output voltage to the discharge load is required.

SUMMARY

The present disclosure provides a resonant inverter apparatus supplies a high AC voltage to a discharge load. In this apparatus, an inverter circuit converts a DC voltage to an AC voltage using a plurality of switching elements. A transformer steps up the AC voltage and generates a high AC voltage. A DC voltage detecting unit detects a value of a DC voltage supplied to the inverter circuit. A control unit generates a driving pulse for performing on/off switching of the switching elements. The switching elements include first and second switching elements. The control unit performs phase angle control of the driving pulse. In response to the detected value of the DC voltage being greater than a reference value, the control unit sets a switching phase angle of the second switching element relative to the first switching element serving as reference, based on the magnitude of the valued of the DC voltage.

BRIEF DESCRIPTION OF THE DRAWINGS

In the accompanying drawings:

FIG. 4 is a diagram for explaining an overview of the phase angle control performed by the resonant inverter apparatus according to the first embodiment;

FIG. 12A to FIG. 12C are diagrams for explaining a resonant inverter apparatus of the first comparison example;

FIG. 23A and FIG. 23B are flowcharts of a driving pulse generating process performed by a control unit of the resonant inverter apparatus according to the third embodiment.

DESCRIPTION OF THE EMBODIMENTS

Figure 1:
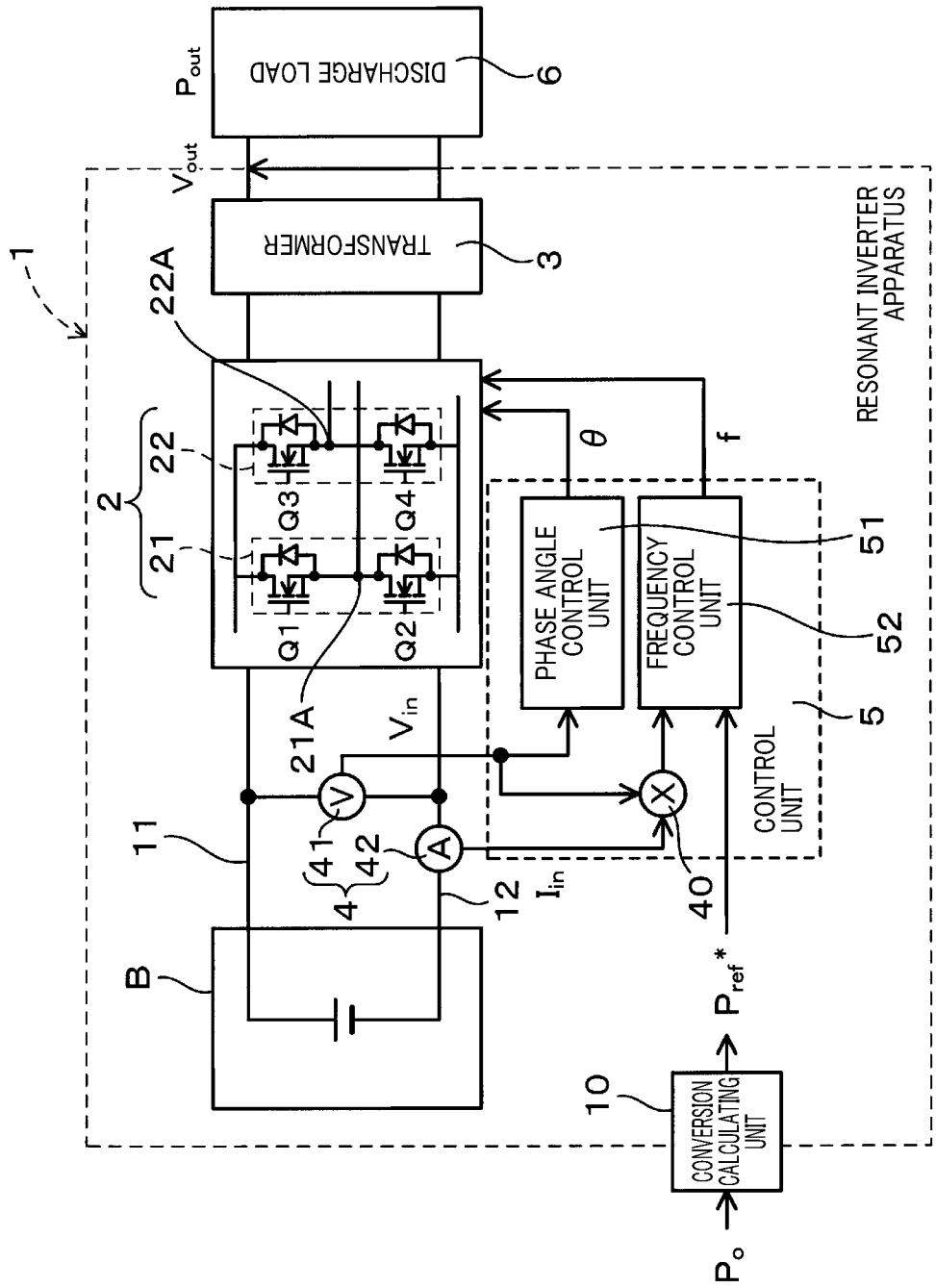
FIG. 1 is an overall schematic diagram of a resonant inverter apparatus according to a first embodiment.

JP-A-2017-085793 discloses a voltage resonance-type inverter apparatus that controls an output voltage by a control circuit. In the voltage resonance-type inverter apparatus, a converter that steps up, steps down, or steps up and down a voltage that has been inputted from a commercial power supply and subjected to full-wave rectification is provided in an early stage. A resonance circuit is arranged in a latter stage. The resonance circuit uses the voltage that is generated by the converter as an input source. The resonance circuit applies excitation energy to a transformer and resonates a capacitive output load and an output inductance of the transformer. For example, the control circuit detects a peak voltage of the output voltage and generates a state signal using the detected peak voltage. The control circuit then performs feedback of the state signal for a control signal of the converter such that a resonance output is fixed. The control circuit thereby increases and decreases the generated voltage of the input source.

A conventional inverter apparatus is configured as an apparatus that uses a commercial AC power supply and outputs a high AC voltage that is supplied to a plasma processing apparatus or the like. Meanwhile, when such an apparatus is applied to an onboard apparatus, because a battery voltage of an onboard battery that serves as a power supply easily varies, conventional input-voltage control in which input of a fixed voltage is presumed does not function in a normal manner. That is, even when switching control of the converter is performed based on a detection signal of the output voltage, in a state in which the battery voltage varies, control delay and the like occur due to the effects of variation in the battery voltage. The desired effects cannot be obtained.

It is thus desired to provide a resonant inverter apparatus that is capable of providing stable output power.

An exemplary embodiment provides a resonant inverter apparatus that supplies a high AC voltage to a discharge load. The resonant inverter apparatus includes: a DC voltage power supply that outputs a DC voltage; an inverter circuit that converts the DC voltage to an AC voltage by on/off switching of a plurality of switching elements; a transformer that steps up the AC voltage and generates the high AC voltage; a DC voltage detecting unit that detects a value of a DC voltage that is supplied from from the DC voltage power supply to the inverter circuit; and a control unit that generates a driving pulse for performing the on/off switching of the switching elements. The plurality of switching elements include at least one first switching element and at least one second switching element other than the first switching element. The control unit includes a phase angle control unit that performs phase angle control of the driving pulse, the phase angle control unit setting a switching phase angle of the second switching element relative to the first switching element that serves as reference, based on the magnitude of the value of the DC voltage, in response to the value of the DC voltage detected by the DC voltage detecting unit being greater than a reference value.

In the resonant inverter apparatus configured as described above, the DC voltage that is supplied from the DC voltage power supply to the inverter circuit is converted to an AC voltage through the on/off switching of the plurality of switching elements. Furthermore, the AC voltage is supplied to the discharge load as the high AC voltage that has been stepped up by the transformer.

Here, for example, when the resonant inverter apparatus is applied to an onboard apparatus, the value of the DC voltage that is supplied from a vehicle DC power supply to the inverter circuit varies in accompaniment with operation of an auxiliary apparatus and the like. However, variation in output can be suppressed by the control unit performing the phase angle control of the driving pulse for the plurality of switching elements. That is, the switching phase angle relative to the driving pulse that serves as reference is set based on the magnitude of variation from a value of a voltage that serves as reference. As a result, a peak value of an output voltage that is outputted to the discharge load can be fixed. Increase in output voltage when the input voltage increases can be suppressed.

As described above, according to the above-described exemplary embodiment, a resonant inverter apparatus that is capable of producing stable output power relative to variation in input voltage can be provided.

First Embodiment

A resonant inverter apparatus according to a first embodiment will be describe with reference to FIG. 1 to FIG. 11.

As shown in FIG. 1, a resonant inverter apparatus 1 according to the present embodiment includes a DC voltage power supply (referred to hereafter as a power supply, as appropriate) B, an inverter circuit 2, a transformer 3, a DC voltage detecting unit 41, and a control unit 5. The inverter circuit 2 includes switching elements Q1 to Q4 (corresponding to first switching elements Q1 and Q2 and second switching elements Q3 and Q4). The resonant inverter apparatus 1 controls driving of the switching elements Q1 to Q4 by the control unit 5. The resonant inverter apparatus 1 thereby supplies a predetermined high AC voltage to a discharge load 6.

Specifically, the control unit 5 generates a driving pulse for on/off switching (on/off operation) of the switching elements Q1 to Q4. A DC voltage that is outputted from the power supply B is converted to an AC voltage by the switching elements Q1 to Q4 being turned on and off in the inverter circuit 2. The transformer 3 steps up the AC voltage that is outputted from the inverter circuit 2. The transformer 3 then outputs the stepped-up voltage to the discharge load 6 as the predetermined high AC voltage (referred to hereafter as an output voltage, as appropriate) Vout. As a result, the discharge load 6 generates discharge.

To control the discharge, the DC voltage detecting unit 41 detects a DC voltage value (referred to hereafter as an input voltage, as appropriate) Vin that is inputted from the power supply B to the inverter circuit 2.

In addition, the control unit 5 includes a phase angle control unit 51. The phase angle control unit 51 performs phase angle control of the driving pulse for the switching elements Q1 to Q4. When the input voltage Vin detected by the DC voltage detecting unit 41 is greater than a reference value, the phase angle control unit 51 sets a switching phase angle (referred to, hereafter, as an SW phase angle) θ of the switching elements Q3 and Q4 (corresponding to the second switching elements) that are other switching elements relative to the switching elements Q1 and Q2 (corresponding to the first switching elements) that serve as reference, based on the magnitude of the input voltage Vin. As a result, a stable output voltage Vout can be obtained relative to variation in the input voltage Vin.

The inverter circuit 2 is configured by a first arm 21 and a second arm 22 being connected in parallel. The first arm 21 includes a pair of switching elements Q1 and Q2 (corresponding to the first switching elements). The second arm 22 includes a pair of switching elements Q3 and Q4 (corresponding to the first switching elements). In addition, two ends (first and second ends) of a primary coil 31 of the transformer 3 are respectively connected to a center point 21A of the first arm 21 and a center point 22A of the second arm 22 (for example, see FIG. 2).

At this time, the control unit 5 generates a driving pulse such that, during a single control cycle, the first arm 21 and the second arm 22 are alternately turned on and off, and regarding each of the pair of switching elements Q1 and Q2 of the first arm 21 and the pair of switching elements Q3 and Q4 of the second arm 22, one switching element in each pair is turned off when the other switching element is turned on. The phase angle control unit 51 sets an amount of shifting towards a delay-angle side of the driving pulse that is outputted to the second arm 22, relative to the driving pulse that is outputted to the first arm 21 that serves as reference, as the switching phase angle θ.

The power supply B is preferably an onboard battery. The phase angle control unit 51 preferably performs feed-forward control of the SW phase angle θ that is set at each control cycle, based on the input voltage Vin.

In addition, the control unit 5 preferably further includes a frequency control unit 52. The frequency control unit 52 sets a switching frequency (referred to, hereafter, as an SW frequency) of the driving pulse that is supplied to the switching elements Q1 to Q4, based on a target input power Pref* that is a target value of input power Pin that is inputted to the inverter circuit 2.

The resonant inverter apparatus 1 according to the present embodiment will be described in detail, below.

In FIG. 1, for example, the resonant inverter apparatus 1 is used as an onboard resonant inverter apparatus that is applied to an ozonizer that is mounted in a vehicle and of which a main component is a discharge reactor, or the like. The discharge reactor serves as the discharge load 6. The resonant inverter apparatus 1 supplies a high AC voltage to the discharge reactor. The ozonizer uses ozone that is generated by the discharge reactor and reforms exhaust gas that is discharged from an engine of the vehicle (not shown).

For example, the resonant inverter apparatus 1 inputs the DC voltage of the power supply B that is the onboard battery to the inverter circuit 2. The resonant inverter apparatus 1 then converts the DC voltage to a predetermined AC voltage and supplies the predetermined AC voltage to the transformer 3. A power measuring unit 4 is arranged between the power supply B and the inverter circuit 2. The power measuring unit 4 includes the DC voltage detecting unit 41 and a DC current detecting unit 42.

The control unit 5 controls driving of the inverter circuit 2 based on detection signals from the detecting units 41 and 42, and a command power signal from an external control apparatus (not shown). The control unit 5 makes the transformer 3 generate a high AC voltage and supplies the high AC voltage to the discharge load 6.

In the inverter circuit 2, the switching elements Q1 to Q4 configure a full-bridge circuit. The switching elements Q1 to Q4 are arranged between a positive terminal line 11 and a negative terminal line 12 of the power supply B, and form the first arm 21 and the second arm 22 that are connected to each other in parallel. The first arm 21 is composed of the pair of switching elements Q1 and Q2 that are connected in series. The second arm 22 is composed of the pair of switching elements Q3 and Q4 that are connected in series.

For example, each of the switching elements Q1 to Q4 is composed of a combination of a power element, such as a metal-oxide-semiconductor field-effect transistor (MOSFET) or an insulated-gate bipolar transistor (IGBT), and a diode, as shown in the drawings. The diode is connected in antiparallel to each of the switching elements Q1 to Q4.

Figure 2:
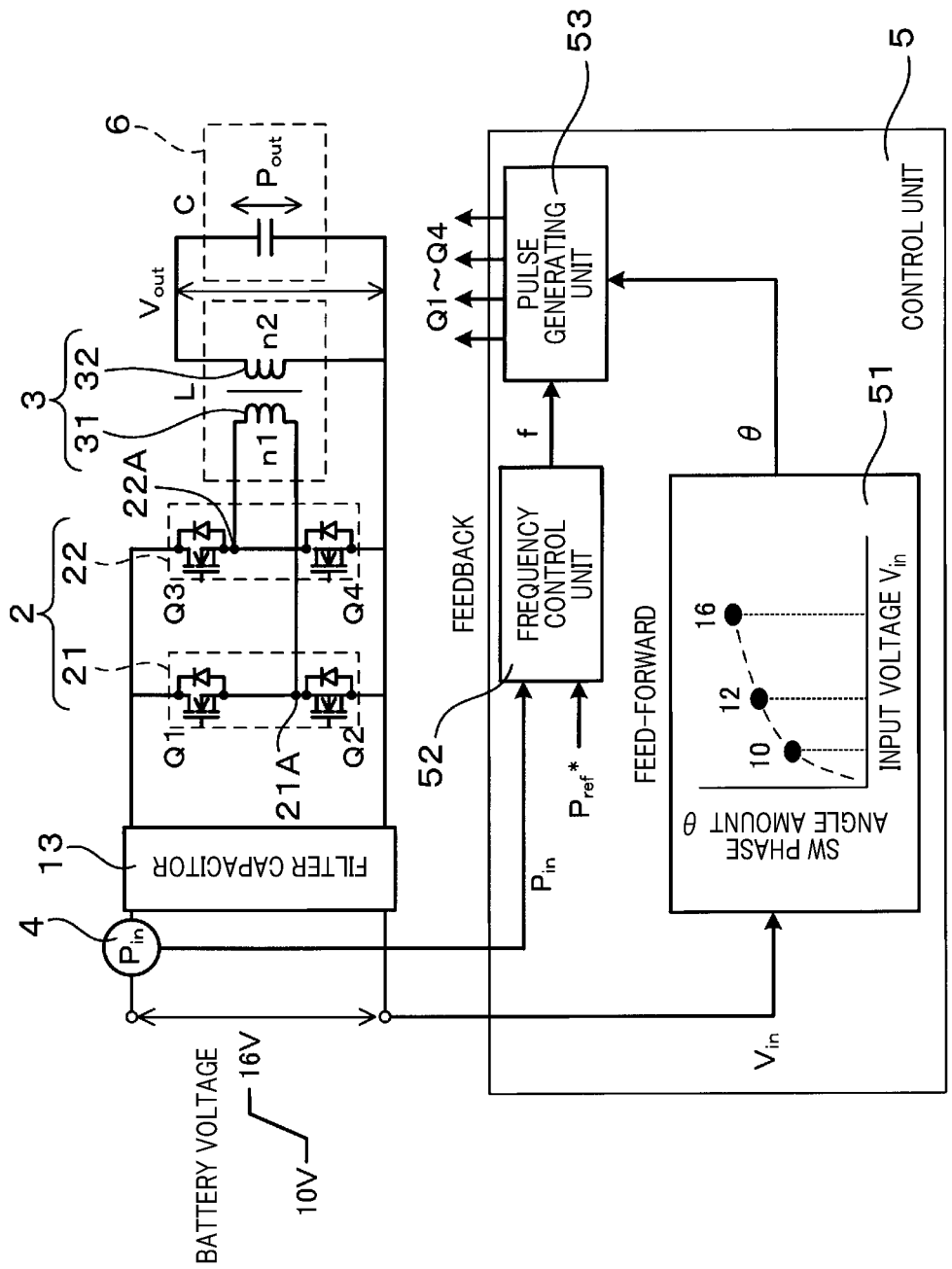
FIG. 2 is a circuit diagram showing an overview of control performed by the resonant inverter apparatus according to the first embodiment.

For example, as shown in FIG. 2, the transformer 3 has a publicly known configuration in which the primary coil 31 and a secondary coil 32 are magnetically coupled. The transformer 3 steps up the AC voltage from the inverter circuit 2 and generates the predetermined high AC voltage.

At this time, a number of turns n1 of the primary coil 31 and a number of turns n2 of the secondary coil 32 are set so as to be n1<n2. A step-up effect based on a turn ratio of the primary coil 31 and the secondary coil 32 is obtained. In addition, a secondary current I2 that flows through the secondary coil 32 resonates at a resonance frequency fr ($=1/2\pi\sqrt{LC}$) that is determined by capacitance C of the discharge load 6 and leakage inductance L. Therefore, as a result of a combination of the step-up effect attributed to the turn ratio of the transformer 3 and a step-up effect attributed to resonance, a high secondary voltage V2 is generated.

Here, the center point 22A of the second arm 22 is connected to a positive terminal of the primary coil 31. The center point 21A of the first arm 21 is connected to a negative terminal of the primary coil 31. Therefore, a current in a reverse direction flows to the primary coil 31 as a result of the switching operation being alternately performed on the first arm 21 and the second arm 22. In addition, as shown in FIG. 2, a filter capacitor 31 for smoothing may be arranged between the power measuring unit 4 and the inverter circuit 2.

The power measuring unit 4 includes the DC voltage detecting unit 41 and the DC current detecting unit 42 on the input side of the inverter circuit 2. The DC voltage detecting unit 41 is arranged between the positive terminal line 11 and the negative terminal line 12 of the power supply B. The DC current detecting unit 42 is arranged on the negative terminal line 12.

The power measuring unit 4 detects the input voltage Vin that is inputted to the inverter circuit 2 by the DC voltage detecting unit 41. The power measuring unit 4 also detects an input current Iin by the DC current detecting unit 42. The detection results from the DC voltage detecting unit 41 and the DC current detecting unit 42 are transmitted to the control unit 5. A multiplying unit 40 multiplies the input voltage Vin and the input current Iin, and calculates the input power Pin.

Here, the DC current detecting unit 42 is arranged on the negative terminal line 12 side. However, the DC current detecting unit 42 may be arranged on the positive terminal line 11 side.

In addition, the target input power Pref* is inputted to the control unit 5 from a conversion calculating unit 10. A target output power (that is, command power) Po* is inputted to the conversion calculating unit 10 from an external control apparatus (not shown). For example, the conversion calculating unit 10 can calculate circuit efficiency of the inverter circuit 2. The conversion calculating unit 10 can then calculate a value that is obtained by dividing the target output power Po* by the circuit efficiency as the target input power Pref*.

The control unit 5 generates the driving pulse for the plurality of switching elements Q1 to Q4 that configure the inverter circuit 2. The control unit 5 thereby performs the on/off switching of the switching elements Q1 to Q4 at a predetermined timing. The control unit 5 includes the phase angle control unit 51 and the frequency control unit 52. The phase angle control unit 51 controls the SW phase angle $\theta$. The frequency control unit 52 controls a SW frequency f. The input voltage Vin is successively inputted to the phase angle control unit 51 from the DC voltage detecting unit 41. In addition, the input power Pin is successively inputted to the frequency control unit 52 from the multiplying unit 40.

Specifically, as shown in FIG. 2, the input voltage Vin is equivalent to the battery voltage of the power supply B. The input voltage Vin varies (such as from 10 V to 16 V) due to the effects of an auxiliary apparatus (not shown) or the like that is connected to the power supply B. At this time, based on a relationship between the input voltage Vin and the SW phase angle $\theta$ that is known in advance, when the input voltage Vin is greater than a reference value, the phase angle control unit 51 sets the SW phase angle $\theta$ using the detected input voltage Vin. For example, the reference value is a lower limit value (such as 10 V) of an expected battery voltage range. For example, the SW phase angle $\theta$ is set so as to increase as the input voltage Vin increases.

As described hereafter, during phase angle control, feed-forward control is preferably performed so as to suppress the effects of variation in the input voltage Vin. In addition, the reference value is not limited to the lower limit value of the expected battery voltage range. The reference value can be arbitrarily set to a predetermined value that is greater than the lower limit value (such as a standard value of the battery voltage: 12 V).

Furthermore, for example, the frequency control unit 52 can perform feedback control of the SW frequency f such that the input power Pin from the power measuring unit 4 becomes closer to the target input power Pref*, based on the result of a comparison between the input power Pin and the target input power Pref*.

The control unit 5 controls driving of the switching elements Q1 to Q4 based on the SW phase angle $\theta$ and the SW frequency f that are acquired in the foregoing manner. The control unit 5 includes a pulse generating unit 53 that generates the driving pulse for driving the switching elements Q1 to Q4.

Next, switching control performed by the control unit 5 will be described in further detail.

Figure 3A:
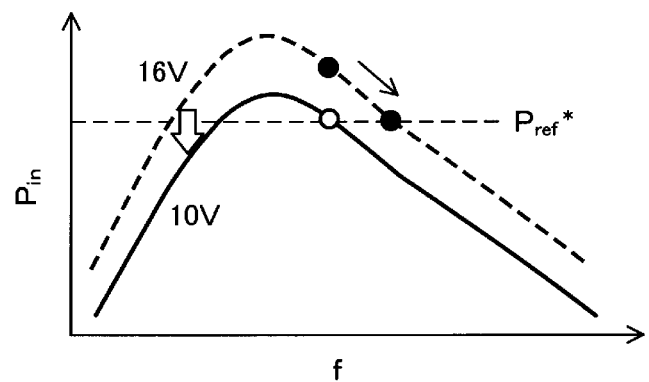
FIG. 3A and FIG. 3B are diagrams for explaining frequency control and phase angle control performed by the resonant inverter apparatus according to the first embodiment.
Figure 3B:
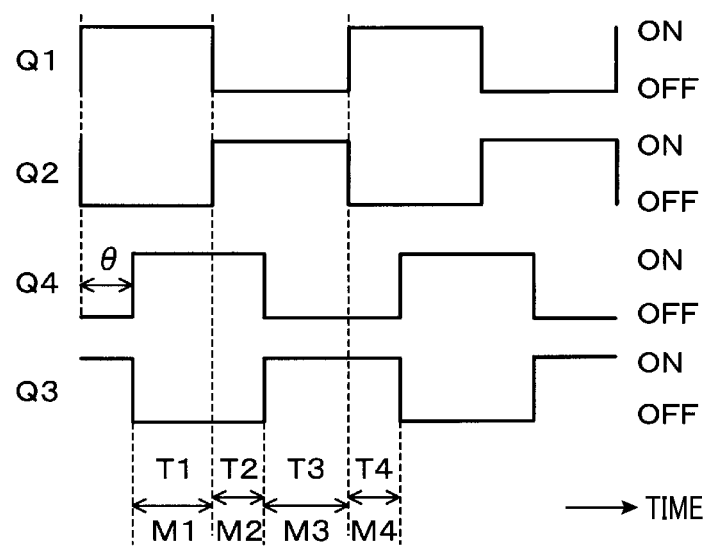

As shown in FIG. 3B, a predetermined driving pulse is inputted to a gate of each of the switching elements Q1 to Q4 of the inverter circuit 2. On/off switching of the switching elements Q1 to Q4 is thereby controlled. The driving pulse has the predetermined SW frequency f. The driving pulse that is supplied to the gates of the switching elements Q1 and Q2 and the driving pulse that is supplied to the gates of the switching elements Q3 and Q4 have the predetermined SW phase angle $\theta$.

In the frequency control unit 52, the control unit 5 sets the SW frequency f such that the input power Pin becomes the target input power Pref*. In addition, in the phase angle control unit 51, the control unit 5 sets the SW phase angle $\theta$ based on the input voltage Vin, such that the driving pulse of the switching elements Q3 and Q4 of the second arm 22 is delayed with reference to the driving pulse of the switching elements Q1 and Q2 of the first arm 21.

As shown in FIG. 3A, the relationship between the input power Pin and the SW frequency f changes based on the input voltage Vin. For example, when the input voltage Vin decreases from 16 V (indicated by a dotted line in the drawing) to 10 V (indicated by a solid line in the drawing), a peak value of the input voltage Vin decreases. The SW frequency f that corresponds to the target input power Pref* changes.

Therefore, in the frequency control unit 52, the input power Pin can be brought closer to the target input power Pref* by the input power Pin and the target input power Pref* being compared, and feedback control of the SW frequency f being performed based on the comparison result.

In addition, as shown in FIG. 4, a peak value of the output voltage Vout changes based on the input voltage Vin. For example, when the driving pulse of the first arm 21 and the driving pulse of the second arm 22 do not have a phase difference (that is, $\theta=0$ deg), if the input voltage Vin changes from 10 V to 16 V, the peak value of the output voltage Vout increases as the input voltage Vin increases.

Therefore, in the phase angle control unit 51, the peak value of the output value Vout can be adjusted by the SW phase angle $\theta$ being set based on the input voltage Vin, and a phase difference being provided between the driving pulse of the first arm 21 and the driving pulse of the second arm 22. Specifically, the driving pulse of the switching elements Q3 and Q4 of the second arm 22 is shifted towards the delay-angle side, relative to the driving pulse of the switching elements Q1 and Q2 of the first arm 21. The SW phase angle $\theta$ is set so as to increase as the input voltage Vin increases.

At this time, the peak value of the output voltage Vout is changed as a result of the switching elements Q1 to Q4 being turned on/off in switching modes shown in FIG. 3B, and periods T1 to T4 that correspond to switching modes M1 to M4 being changed based on the magnitude of the SW phase angle $\theta$. As a result, variation in the input voltage Vin is cancelled out and the output voltage Vout is controlled so as to be fixed.

The switching modes are: mode M1 in which the switching elements Q1 and Q4 are turned on; mode M2 in which the switching elements Q2 and Q4 are turned on; mode M3 in which the switching elements Q2 and Q3 are turned on; and mode M4 in which the switching elements Q1 and Q3 are turned on. The switching modes M1 to M4 are repeated in this order.

The switching elements Q1 and Q2 of the first arm 21 and the switching elements Q3 and Q4 of the second arm 22 are driven at a same switching frequency and a same duty. The duty is a ratio of an on-period to a single control cycle (that is, on-period/(on-period+off-period)). The duty is a fixed value (for example, duty=0.5). Regarding the two switching elements Q1 and Q2 of the first arm 21 and the two switching elements Q3 and Q4 of the second arm 22, one switching element is off when the other switching element is on.

As a result of the feed-forward control by the phase angle control unit 51 being performed in addition to the feedback control by the frequency control unit 52 in the foregoing manner, control that promptly reflects the variation in the input voltage Vin that is inputted to the inverter circuit 2 can be performed. The effects of the variation in the input voltage Vin can be suppressed.

Next, more detailed steps of the driving pulse generating process performed by the control unit 5 will be described with reference to the flowchart in FIG. 5. Steps S2 and S5 correspond to the phase angle control unit 51. Steps S1, and S6 to S13 correspond to the frequency control unit 52.

Figure 5:
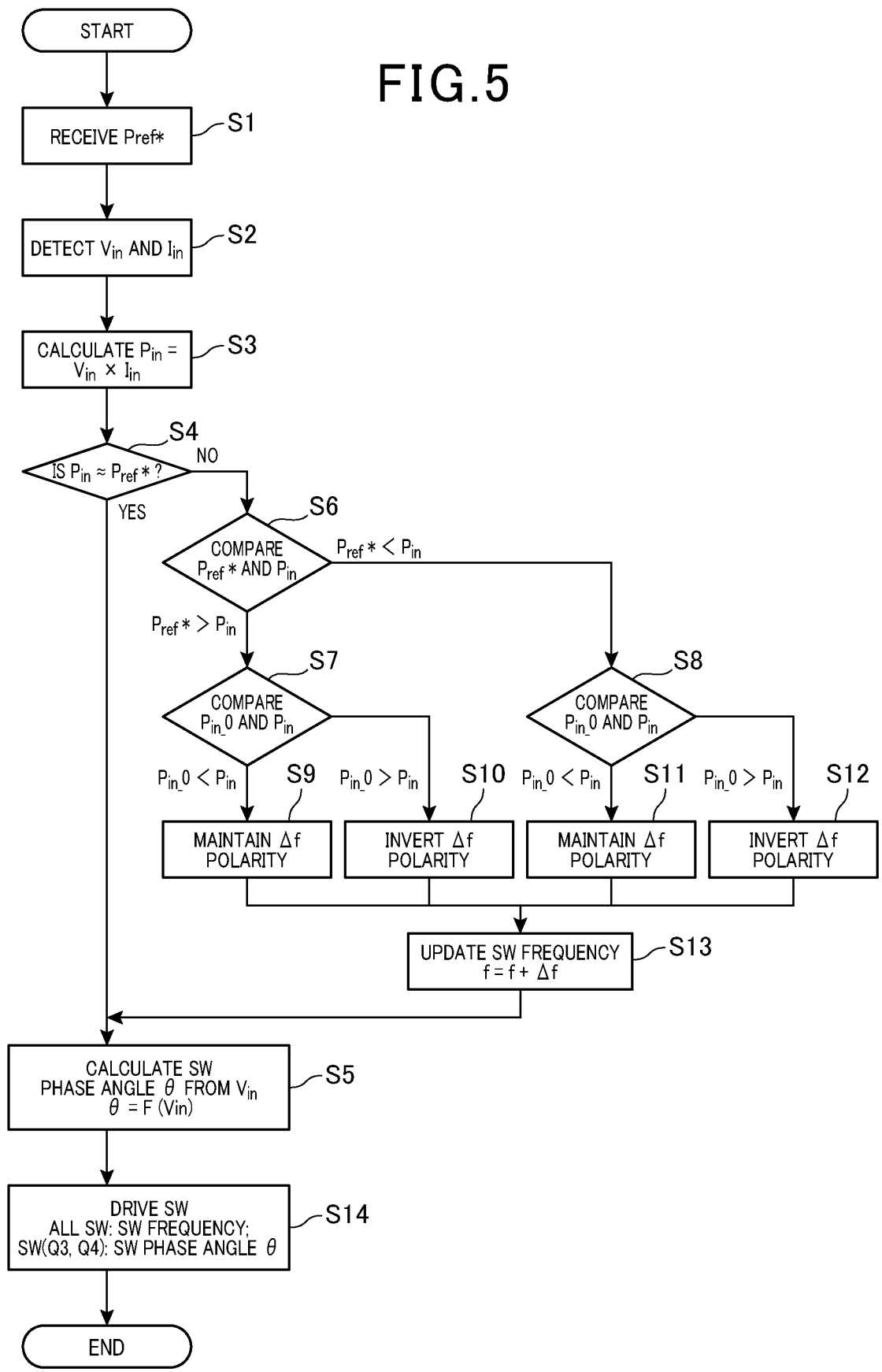
FIG. 5 is a flowchart of a driving pulse generating process performed by a control unit according to the first embodiment.

At step S1 in FIG. 5, the control unit 5 receives the target input power Pref* that is transmitted from the conversion calculating unit 10. At subsequent step S2, the control unit 5 detects the input voltage Vin in the DC voltage detecting unit 41 and detects the input current Iin in the DC current detecting unit 42. Furthermore, at step S3, the control unit 5 calculates the input power Pin in the multiplying unit 50 using the detected input voltage Vin and input current Iin.

Then, at step S4, the control unit 5 determines whether the calculated input power Pin and the target input power Pref* are substantially equal (that is, Pin≈Pref*). In this case, for example, the control unit 5 can determine whether the calculated input power Pin and the target input power Pref* are substantially equal based on whether the input power Pin falls within a predetermined range (that is, Pref*±α) of which the target input power Pref* is at the center, using a value ±α (such as ±10%) that is set in advance taking into consideration detection error and the like.

When determined Yes at step S4, the control unit 5 proceeds to step S5 and performs setting for the SW phase angle control. When determined No at step S4, the control unit 5 proceeds to step S6 to update the setting of SW frequency control. At step S6, the control unit 5 compares the target input power Pref* and the input power Pin. When determined that the target input power Pref* is greater than the input power Pin (that is, Pref*>Pin), the control unit 5 proceeds to step S7. When determined that the target input power Pref* is less than the input power Pin (that is Pref*<Pin), the control unit 5 proceeds to step S8.

At step S7, the control unit 5 further compares input power Pin_0 that has been calculated during a previous control cycle and the input power Pin that is currently calculated. Then, when determined that the previous input power Pin_0 is less than the current input power Pin (that is, Pin_0<Pin), the control unit 5 proceeds to step S9.

The control unit 5 maintains a polarity of a change width (frequency change) Δf that is used to update the SW frequency f. When determined that the previous input power Pin_0 is greater than the current input power Pin (that is, Pin_0>Pin), the control unit 5 proceeds to step S10. The control unit 5 inverts the polarity of the change width Δf that is used to update the SW frequency f. At this time, the magnitude of the change width Δf can be arbitrarily set.

Upon proceeding to step S8 as well, the control unit 5 similarly compares the input power Pin_0 that has been calculated during the previous control cycle and the input power Pin that is currently calculated. Then, when determined that the previous input power Pin_0 is less than the current input power Pin (that is, Pin_0<Pin), the control unit 5 proceeds to step S11.

The control unit 5 inverts the polarity of the change width Δf that is used to update the SW frequency f. When determined that the previous input power Pin_0 is greater than the current input power Pin (that is, Pin_0>Pin), the control unit 5 proceeds to step S10. The control unit 5 maintains the polarity of the change width Δf that is used to update the SW frequency f.

After performing the setting in which the polarity of the change width Δf is maintained or inverted at steps S9 to S12, the control unit 5 proceeds to step S13. The control unit 5 updates the SW frequency f using the change width Δf (that is, f=f+Δf). In other words, when Pref*>Pin and Pin_0<Pin, or Pref*<Pin and Pin_0>Pin, the control unit 5 maintains the polarity of the change width Δf. In addition, when Pref*>Pin and Pin_0>Pin, or Pref*<Pin and Pin_0<Pin, the control unit 5 inverts the polarity of the change width Δf. The SW frequency f is thereby adjusted such that the input power Pin becomes closer to the target input power Pref*.

The SW frequency f that serves as a control state variable is determined in the above-described manner. Specifically, an initial value of the SW frequency f is set in advance (for example to 80 kHz). With the change width Δf thereof as a fixed value (such as 1 kHz), the setting value of the SW frequency f is updated at each control cycle. As a result, the SW frequency f is adjusted until the input power Pin becomes substantially equal to the target input power Pref*.

At step S5, the control unit 5 determines the SW phase angle θ that serves as a control state variable. Specifically, the relationship shown in FIG. 4, described above, is stored in a storage area of the control unit 5 in advance, as an arithmetic expression (such as θ=F (Vin)) or a map of the input voltage Vin and the SW phase angle θ. The control unit 5 can then calculate the SW phase angle θ using the detected input voltage Vin.

Figure 6A:
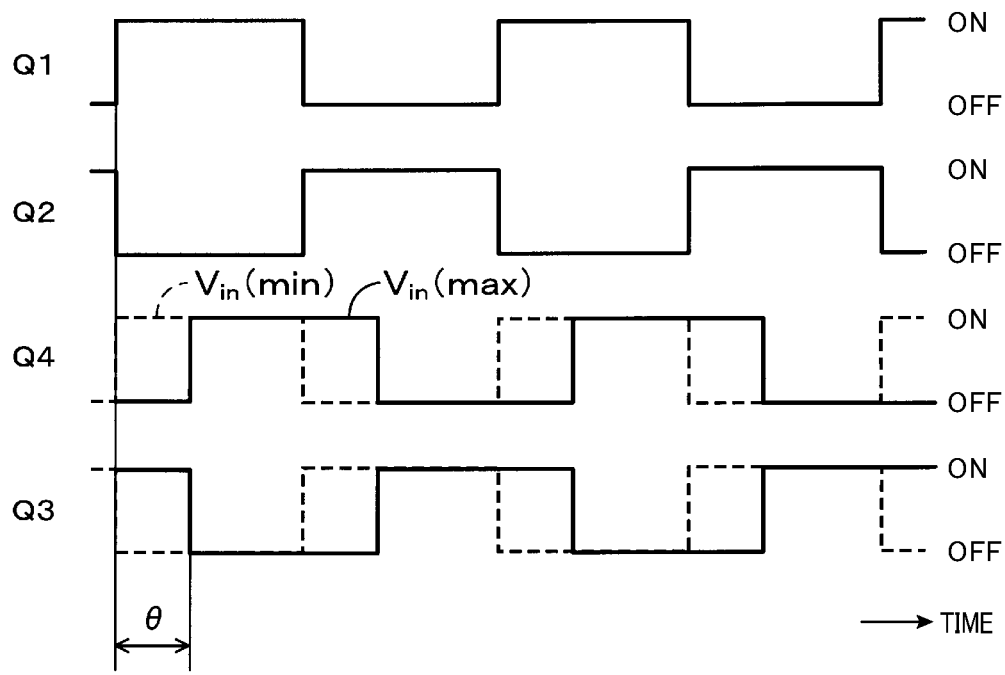
FIG. 6A to FIG. 6C are diagrams for explaining effects depending on whether the phase angle control by the resonant inverter apparatus is performed, according to the first embodiment.

As shown in FIG. 6A, for example, an initial value of the SW phase angle θ is 0 deg and corresponds to an expected minimum value (that is, a reference value) of the input voltage Vin. For example, the setting value of the SW phase angle θ is changed based on the magnitude of the input voltage Vin, such that the SW phase angle θ increases as the input voltage Vin becomes greater than the reference value.

Figure 6B:
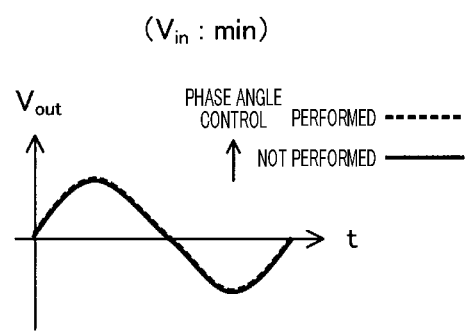
Figure 6C:
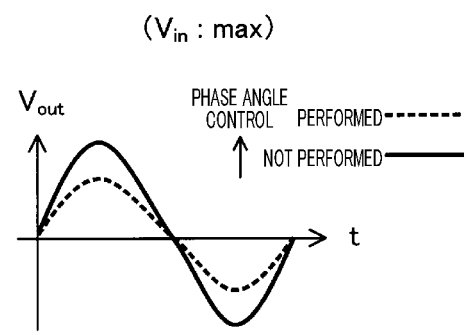

As a result, as shown in FIG. 6B and FIG. 6C, even in cases in which the input voltage Vin from the power supply B suddenly increases from an expected predetermined minimum value to a maximum value, variation in the output voltage Vout can be suppressed as a result of delay-angle control being performed on the switching elements Q3 and Q4 at the SW phase angle θ relative to the switching elements Q1 and Q2.

At step S14, the control unit 5 drives the switching elements Q1 to Q4 of the inverter circuit 2 using the SW frequency f and the SW phase angle θ that serve as the control state variables. Specifically, the control unit 5 drives the switching elements Q1 to Q4 at the SW frequency f and, further, drives the switching elements Q3 and Q4 at the SW phase angle θ.

Figure 7:
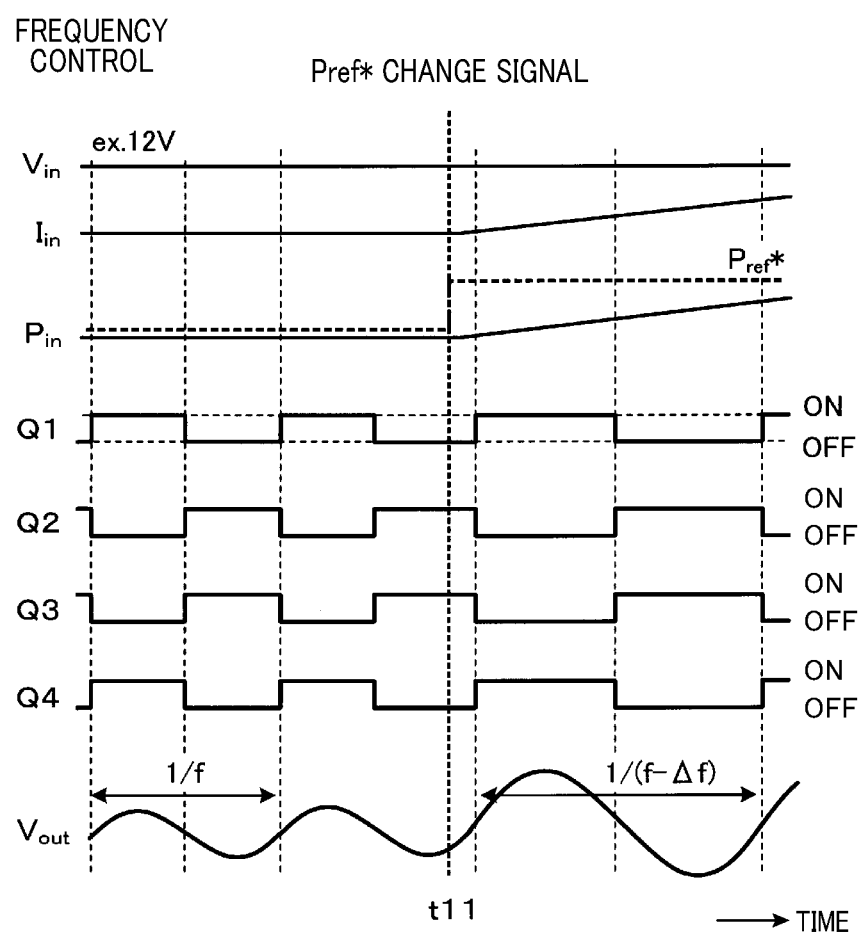
FIG. 7 is a timing chart for explaining the phase angle control performed by the resonant inverter apparatus according to the first embodiment.

As shown in a timing chart of the SW frequency control in FIG. 7, when the input voltage Vin is a fixed value (for example, Vin=12 V), for example, when a change signal for the target input power Pref* is inputted at time t11, the SW frequency f is changed in the frequency control unit 52.

For example, when the target input power Pref* increases, the SW frequency f is changed using the change width of that is based on a previous value and a current value of the input voltage Vin. The SW frequency f is updated so as to shift towards a low-frequency side. At subsequent control cycles, the SW frequency f is updated by feedback control in the frequency control unit 52 until the input power Pin becomes the target input power Pref*.

Figure 8:
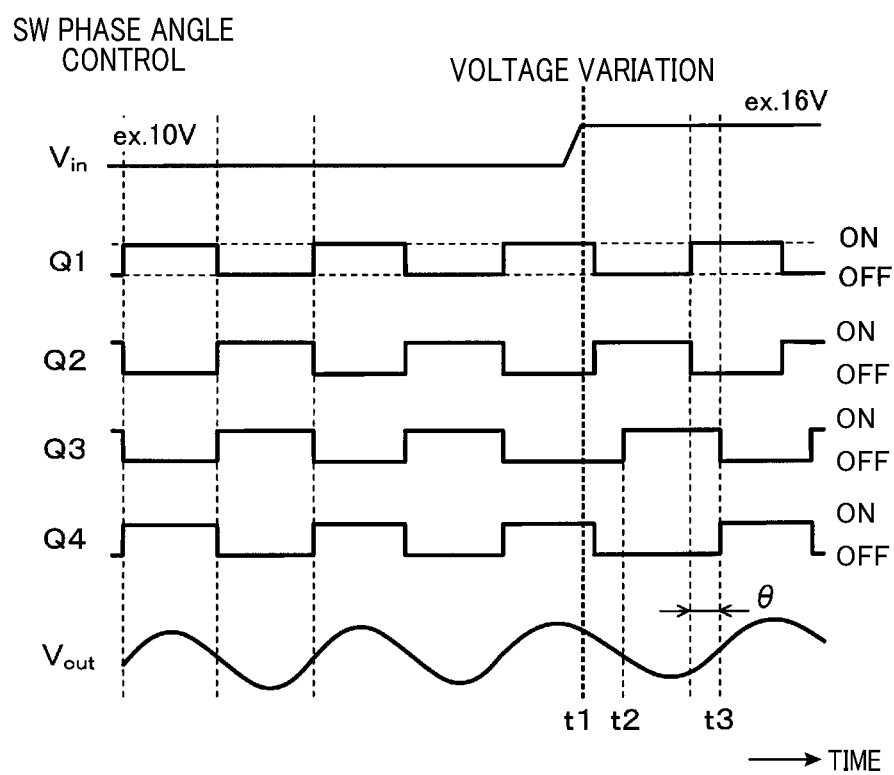
FIG. 8 is a timing chart for explaining the frequency control performed by the resonant inverter apparatus according to the first embodiment.

In addition, as shown in a timing chart of the SW phase angle control in FIG. 8, when the input voltage Vin is a predetermined minimum value (for example, Vin=10 V), the SW phase angle θ of the switching elements Q3 and Q4 relative to the switching elements Q1 and Q2 is the initial value (that is, θ=0 deg). When the input voltage Vin changes from this state and, for example, rapidly increases to a predetermined maximum value (for example, Vin=16 V) at time t1, the SW phase angle θ corresponding to the input voltage Vin is promptly set in the phase angle control unit 51. Then, at time t2 and t3 that are subsequent on-timings, delay-angle control is performed on the switching elements Q3 and Q4 at the updated SW phase angle θ.

Therefore, as a result of feed-forward control being performed on the SW phase angle θ of the switching elements Q3 and Q4 in immediate response to variation in the input voltage Vin so as to reduce the effects of the variation in the input voltage Vin, the output voltage Vout can be held constant even after variation in the input voltage Vin.

As described above, in the resonant inverter apparatus 1 according to the present embodiment, the control unit 5 includes the phase angle control unit 51. Therefore, feed-forward control of the SW phase angle θ is performed in addition to feedback control of the SW frequency f. As a result, a stable output voltage Vout can be acquired with high responsiveness relative to variation in the input voltage Vin. In addition, variations (that is, initial changes) in individual characteristics of circuit components, such as the discharge reactor and the switching elements Q1 to Q4, can be accommodated without the above-described phase angle control being changed.

Figure 9:
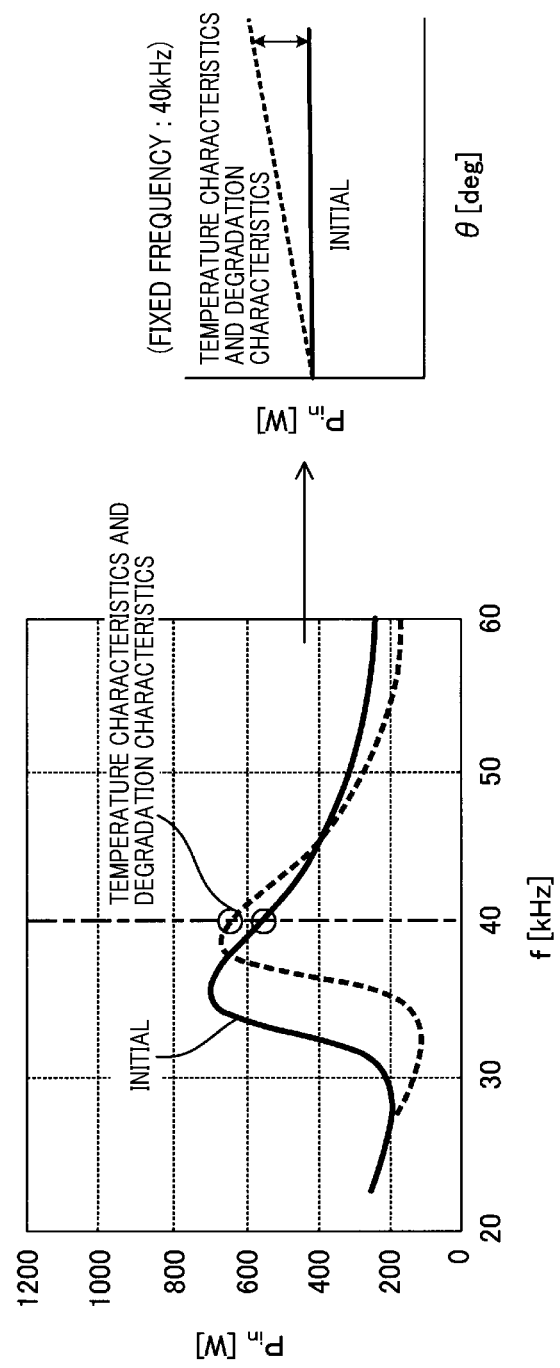
FIG. 9 is a diagram for explaining a method for correcting a phase angle corresponding to temperature characteristics or changes over time of a discharge load connected to the resonant inverter apparatus according to the first embodiment, the diagram showing a relationship between switching (SW) frequency or SW phase angle and input power.

Here, as shown in a left-side drawing in FIG. 9, for example, the relationship between the input power Pin and the SW frequency f transitions as indicated by a dotted line in the drawing as a result of changes over time and the like, relative to initial characteristics indicated by a solid line in the drawing. This transition is caused by temperature characteristics of the ozonizer, changes in electrical characteristics of the discharge reactor accompanying long-term use, and the like (referred to, hereafter, as temperature characteristics and degradation characteristics).

As indicated by circles in the drawing, a significant shift occurs in the input power Pin corresponding to a certain SW frequency f (such as 40 kHz). In this case, as shown in a right-side drawing in FIG. 9, correction that takes into consideration the temperature characteristics and degradation characteristics can be performed during setting of the SW phase angle θ.

As specific processes, first, sweeping (such as 0 deg→60 deg) of the SW phase angle θ (∝ input voltage Vin) is performed at a product shipping stage for each ozonizer. The input power Pin is measured and stored as an initial characteristic.

Next, when a specific SW frequency f (such as 40 kHz) is reached during operation of the ozonizer, the current input power Pin at a predetermined SW phase angle θ is detected. When a difference with the initial characteristic is present, temperature correction is performed based on temperature characteristics that are known in advance and current temperature information. The input power Pin corresponding to the predetermined SW phase angle θ is compared as a reference value using a map, a transformation expression, or the like, with the detection value. When the reference value and the detection value coincide, temperature characteristics correction can be applied in subsequent control.

When the detection value of the current input power Pin and the reference value of the input power Pin based on the temperature information do not coincide, deterioration mode is determined. In this case, for example, through use of a correction coefficient k that is expressed in expression 1, below, the SW phase angle θ can be calculated based on the correction coefficient k and the current input voltage Vin from a computation formula expressed by expression 2, below.

$k=$ current input power $Pin$/input power $Pin$ based on temperature information  Expression 1:

$\theta = k*F(Vin)$  Expression 2:

Next, effects of the resonant inverter apparatus 1 according to the present embodiment will be described with reference to FIG. 10 to FIG. 13, through a comparison with a resonant inverter apparatus 100 of a first comparison example.

As shown in FIG. 12A, the resonant inverter apparatus 100 of the first comparison example is configured such as not to include the phase angle control unit 51 in the control unit 5 and to include a duty control unit 50. Feed-forward control based on the input voltage Vin can be performed through use of such a duty control unit 50, as well. However, as indicated in a comparison of gate waveforms in FIG. 10, because hard switching is performed in the control in the first comparison example, reduced circuit efficiency caused by increased switching loss is an issue. Circuit efficiency can be improved as a result of the SW phase angle control being performed as in the present embodiment. This will be described hereafter.

In FIG. 12A, the duty control unit 50 includes a duty control map such as that shown in the drawing. The duty control unit 50 changes the duty of the driving pulse based on changes in the input voltage Vin. For example, the duty control unit 50 sets the duty so as to decrease as the input voltage Vin increases. The duty control unit 50 thereby performs feed-forward control. As a result, as shown in FIG. 12B and FIG. 12C, when the input voltage Vin changes from 10 V to 16 V, the on-periods of the switching elements Q1 to Q4 are shortened. As a result, electric power that is supplied to the gates can be adjusted.

The pulse generating unit 53 generates a pulse width modulation (PWM) signal based on the duty that is set by the duty control unit 50 and the SW frequency f that is set by the frequency control unit 52. The inverter circuit 2 performs the switching operation to alternately turn on/off the first arm 21 and the second arm 22 based on the PWM signal from the pulse generating unit 53.

Figure 10:
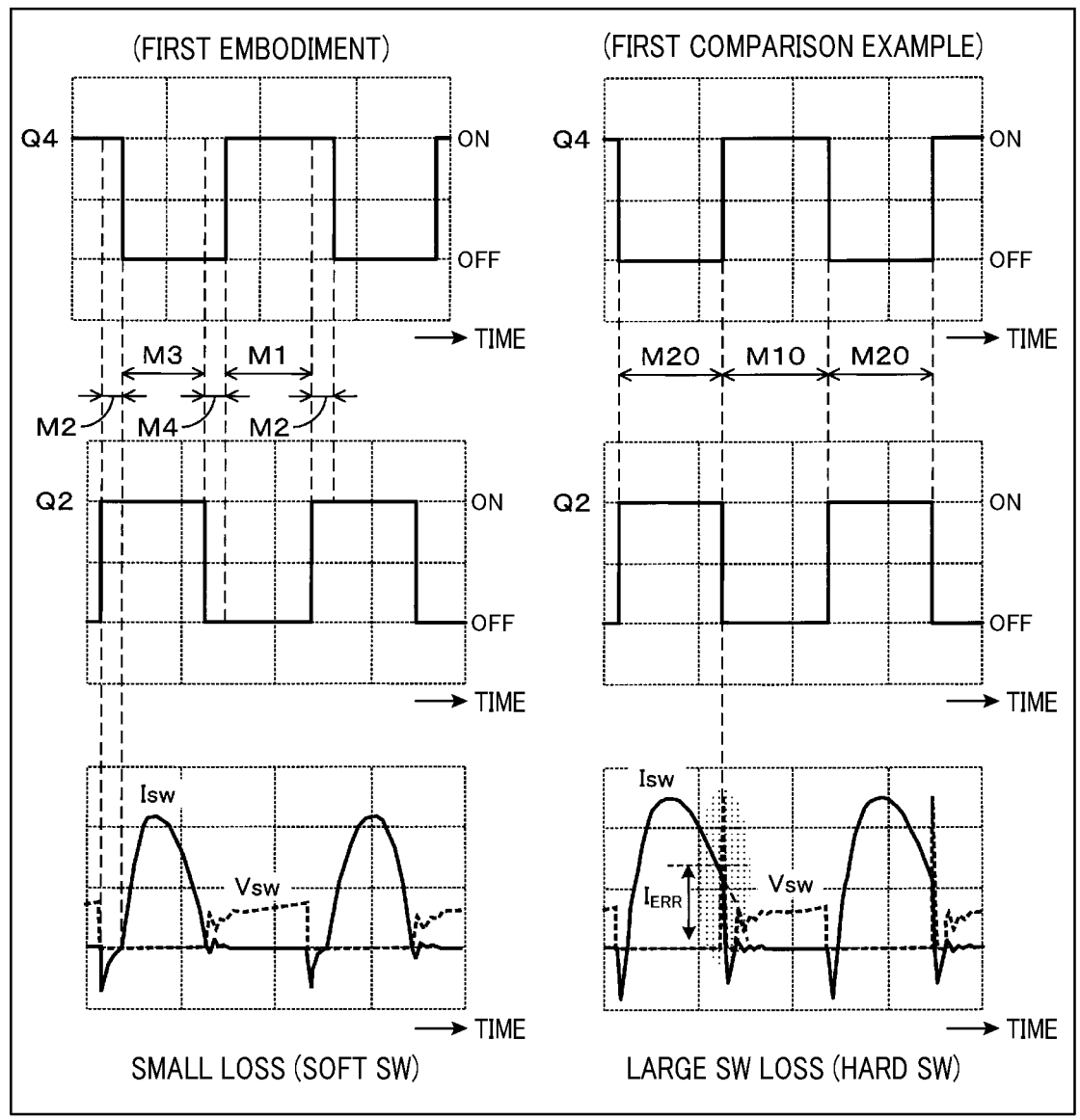
FIG. 10 is a diagram of a comparison of gate waveforms of switching elements, and current and voltage characteristics between the first embodiment and a first comparison example.
Figure 13:
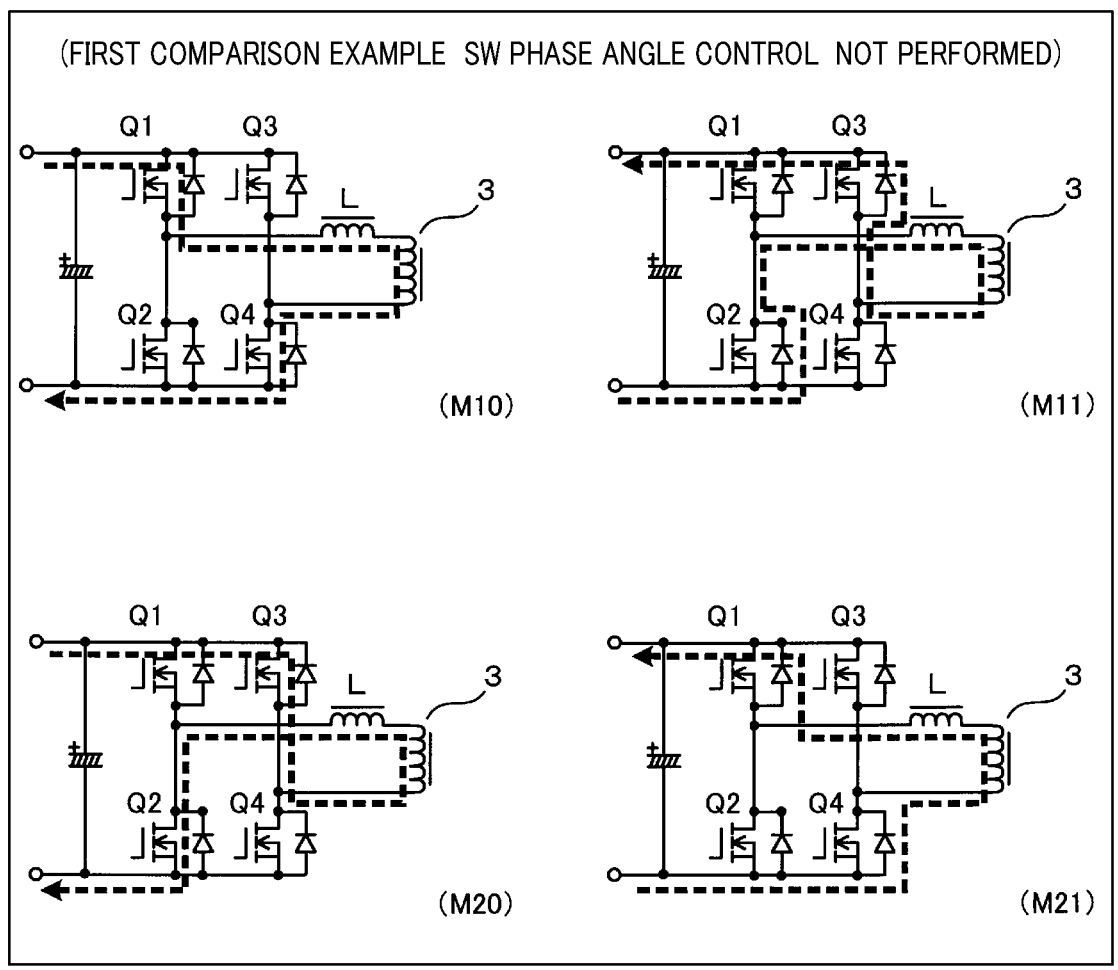
FIG. 13 is a diagram for explaining a switching operation when the phase angle control by the resonant inverter apparatus is not performed in the first comparison example.

That is, as shown in FIG. 10 and FIG. 13, the inverter circuit 2 alternately switches between a mode M10 state and a mode M20 state. In the mode M10 state, the switching elements Q1 and Q4 are simultaneously turned on. In the mode M20 state, the switching elements Q2 and Q3 are simultaneously turned on.

At this time, because the leakage inductance L of the transformer 3 is present, the effect thereof cannot be ignored during a transient state in the switching operation. For example, as a result of a current flowing to the leakage inductance L, energy is accumulated in the mode M10 state or the mode M20 state. Consequently, when the switching mode is switched to the mode M20 state or the mode M10 state, the energy is discharged.

Here, the transient state during the switch from mode M20 to mode 10 is indicated as mode M21 in FIG. 13. In mode M21, all of the switching elements Q1 to Q4 are turned off the instant the switching elements Q2 and Q3 are turned off. In this case, a current that flows towards the positive-terminal side of the power supply B through the leakage inductance L and the diodes of the switching elements Q1 and Q4 flows and becomes a factor in loss. This similarly applies to mode M11 that is a transient state during the switch from mode M10 to mode M20.

At this time, as shown in FIG. 10, the switching element Q2 is turned off by hard switching. Switching loss caused by overlapping of a current Isw and a voltage Vsw of the switching element Q2 becomes large.

Figure 11:
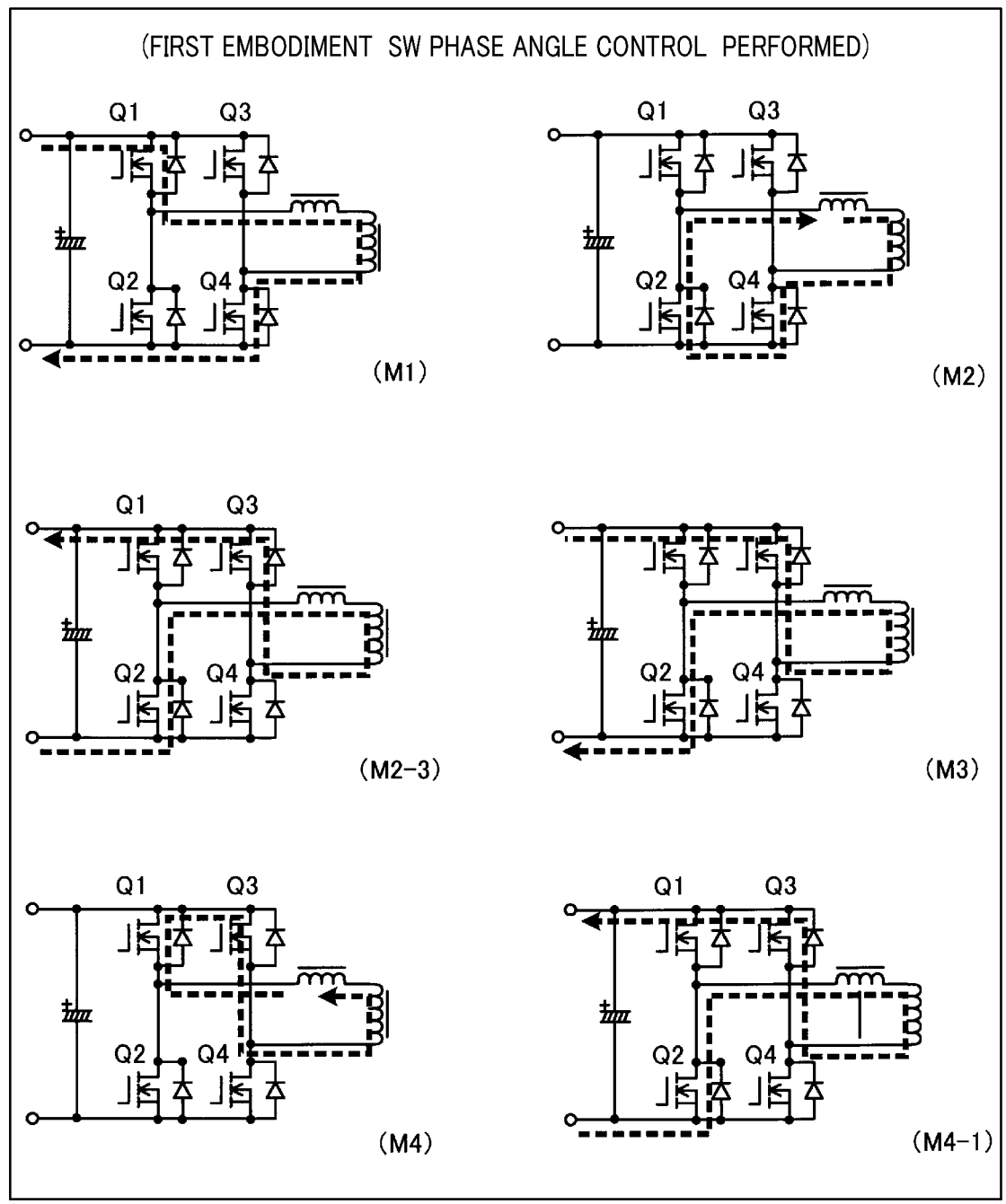
FIG. 11 is a diagram for explaining a switching operation when the phase angle control by the resonant inverter apparatus is performed according to the first embodiment.

In contrast, as shown in FIG. 11, in the configuration according to the first embodiment, the mode M1 state is switched to the mode M3 state through the mode M2 state. In mode M1, the switching elements Q1 and Q4 are turned on. In mode M2, the switching elements Q2 and Q4 are turned on. In mode M3, the switching elements Q2 and Q3 are turned on. In addition, the mode M3 state is switched to the mode M1 state through the mode M4 state. In mode M4, the switching elements Q1 and Q3 are turned on.

Here, the energy that is accumulated in the leakage inductance L in mode M1 becomes a return current that passes through the switching elements Q2 and Q4 in mode M2. As a result, a current that flows from the switching element Q2 towards the leakage inductance L flows. When the switching mode is switched to mode M3 (see, for example, M2-3 in FIG. 11), the switching element Q4 is turned off and the switching element Q3 is turned on. The current that has been flowing towards the switching element Q4 flows towards the switching element Q3.

At this time, the direction of the current in the switching element Q2 does not change, and the current is a current that flows towards the power supply B. Subsequently, when the energy that is accumulated in the leakage inductance L is discharged, the direction of the current is reversed. The current flows from the leakage inductance L towards the switching element Q2.

This also similarly applies when the mode M3 state is switched to the mode M1 state through the mode M4 state in which the switching elements Q1 and Q3 are turned on (see, for example, M4-1 in FIG. 11). At this time, as shown in FIG. 10, the switching element Q2 is turned on and off by soft switching. Switching loss is reduced. In this manner, a more efficient control can be performed as a result of the phase angle control being performed.

First Test Example

A sample of an ozonizer in which the resonant inverter apparatus 1 according to the first embodiment is applied as the discharge reactor was fabricated. A verification experiment regarding the phase angle control operation performed by the control unit 5 was conducted using the SW phase angle control map shown in FIG. 14.

Figure 14:
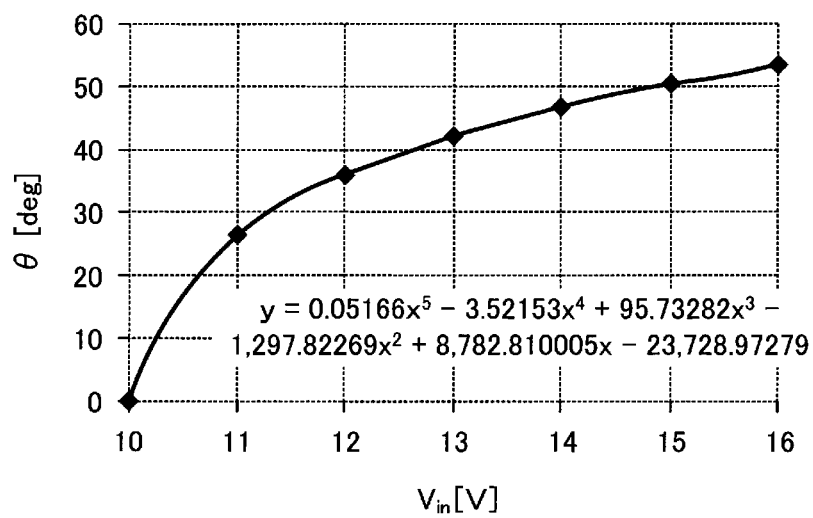
FIG. 14 is a diagram of an example of an SW phase-angle control map used in the phase angle control in a first test example.

The SW phase angle control map was generated in advance based on the relationship between the input voltage Vin and the SW phase angle θ based on actual measurements. The SW phase angle θ is 0 deg when the input voltage Vin is 10 V. The SW phase angle θ increases as the input voltage Vin increases over a range from 10 V to 16 V. As shown in FIG. 14, the relationship between the input voltage Vin and the SW phase angle θ can also be stored in the storage area of the control unit 5 as an arithmetic expression for calculating the SW phase angle θ from the input voltage Vin.

Figure 15:
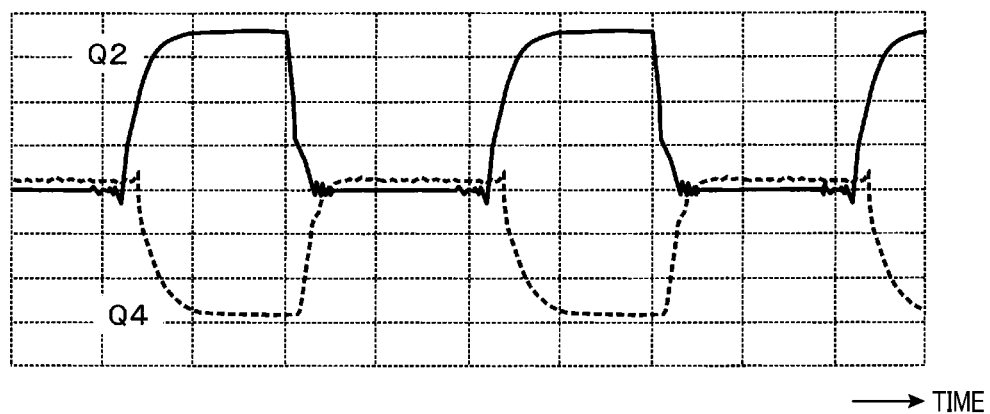
FIG. 15 is a diagram of switching operation waveforms of the phase angle control by the resonant inverter apparatus according to the first embodiment, in the first test example.

As indicated by switching operation waveforms in FIG. 15, regarding the resonant inverter apparatus 1 according to the first embodiment, control of the inverter circuit 2 based on the SW phase angle control map was performed under conditions described below. The phase angle control operation of the switching element Q4 relative to the switching element Q2 was thereby checked.

The conditions and results of the verification experiment are as follows.

Input voltage Vin: 10.5 V
SW frequency f: 50 kHz
SW phase angle control: +15 deg delay angle (duty: 0.45)
Circuit efficiency: 89.8% (input power: 262 W)

Figure 16:
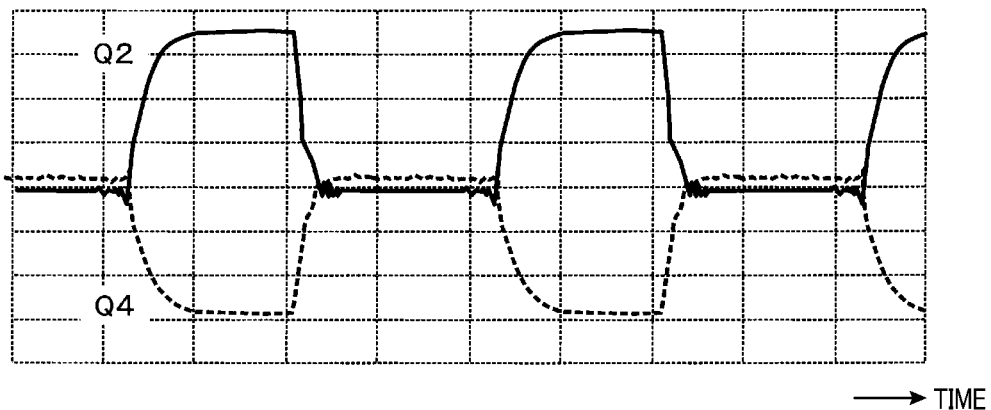
FIG. 16 is a diagram of switching operation waveforms of the phase angle control by the resonant inverter apparatus of the first comparison example, in the first test example.

In addition, a similar verification experiment was conducted on the resonant inverter apparatus 100 of the first comparison example. The results were then compared. As indicated by switching operation waveforms in FIG. 16, in the first comparison example, duty adjustment of the inverter circuit 2 was performed using a duty control map based on the input voltage Vin. The operation waveforms of the switching elements Q2 and Q4 do not have a phase difference.

The conditions and results of the verification experiment are as follows.

Input voltage Vin: 10.5 V
SW frequency f: 50 kHz
Duty control (duty: 0.42)
Circuit efficiency: 87.4% (input power: 269 W)

As described above, in the resonant inverter apparatus 1 according to the first embodiment, circuit efficiency has improved by 2.4% in comparison to that of the resonant inverter apparatus 100 of the first comparison example. It is confirmed that loss can be reduced and efficient control can be obtained through energy recirculation by the SW phase angle control.

Figure 17:
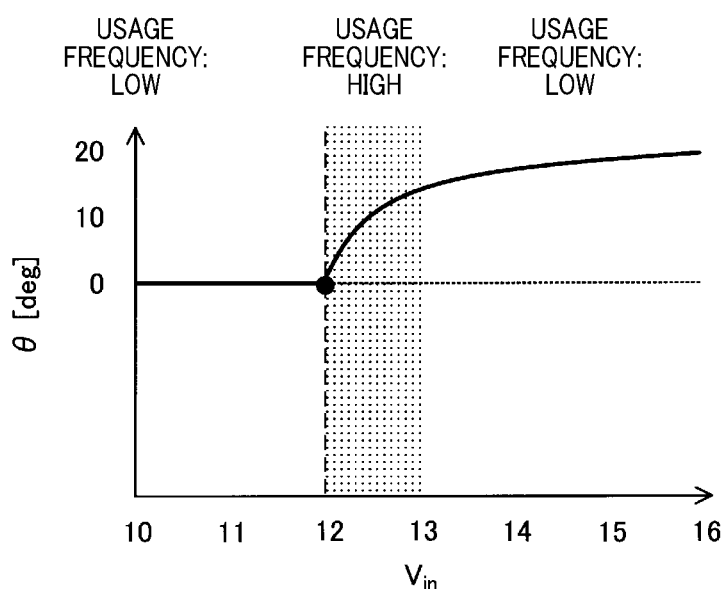
FIG. 17 is a diagram of another example of the SW phase-angle control map according to the first embodiment.

Here, as shown in FIG. 17, the SW phase angle control map can be set such that, of the expected battery voltage range, a high usage-frequency region (such as the input voltage Vin of 12 V to 13 V) in which the input voltage Vin that which is most often used is at the center. In this case, with input voltage Vin=12 V as a reference value and a starting point for SW phase angle control (that is, SW phase angle θ=0 deg), the SW phase angle θ is set so as to gradually increase as the input voltage Vin increases.

As a result, a rate of change of the SW phase angle θ in the high usage-frequency region increases. Controllability of the SW phase angle θ based on the input voltage Vin can be enhanced. Therefore, a long period during which circuit efficiency is kept high can be ensured. In a region in which the input voltage Vin is lower than that in the high usage-frequency region, the SW phase angle θ is 0 deg and compensation control regarding variation in the input voltage Vin is not performed.

Figure 18:
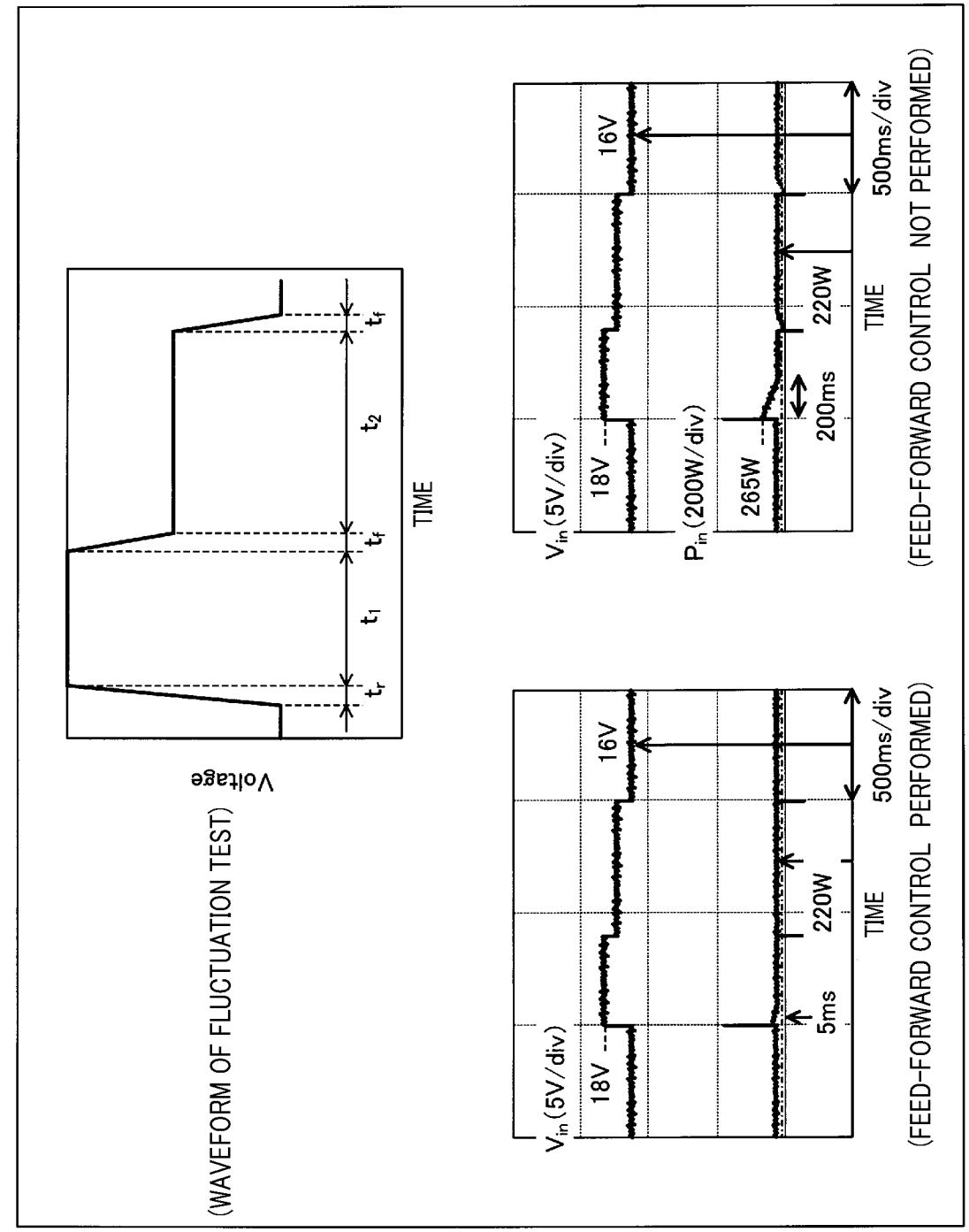
FIG. 18 is a diagram of differences in the switching operation waveforms based on whether feed-forward control by the resonant inverter apparatus is performed in the first test example.

In addition, a fluctuation test of the input voltage Vin shown in FIG. 18 was conducted. The effects of the feed-forward control were checked. As indicated by waveforms of the fluctuation test in FIG. 18, the effects on the output power Pout depending on whether the feed-forward control is performed when the input voltage Vin is changed over a range from 16 V to 18 V were studied. Here, the effects of the feed-forward control based on the input voltage Vin are equivalent in the configuration according to the first embodiment and the configuration of the first comparison example. Therefore, the fluctuation test was conducted using the configuration of the first comparison example.

As indicated through comparison in FIG. 18, when the feed-forward control is not performed, the output power Pout increases when the input voltage Vin increases from 16 V to 18 V. About 20 ms are required for the output power Pout to stabilize. In contrast, when the feed-forward control is performed, the amount of time required for the output power Pout to stabilize when the input voltage Vin increases is shortened to about 5 ms. Control responsiveness is significantly improved.

Second Embodiment

Next, a resonant inverter apparatus according a second embodiment will be described with reference to FIG. 19 to FIG. 21.

According to the above-described first embodiment, the control unit 5 includes the phase angle control unit 51 and the frequency control unit 52. The SW phase angle θ and the SW frequency f are set as the control state variables. According to the present embodiment, an intermittence ratio control unit 54 is further provided. An intermittence ratio b is set as a control state variable. Here, reference numbers used according to the second embodiment and subsequent embodiments that are the same as those used in the foregoing embodiment indicate a similar constituent element or the like, unless otherwise stated.

Figure 19:
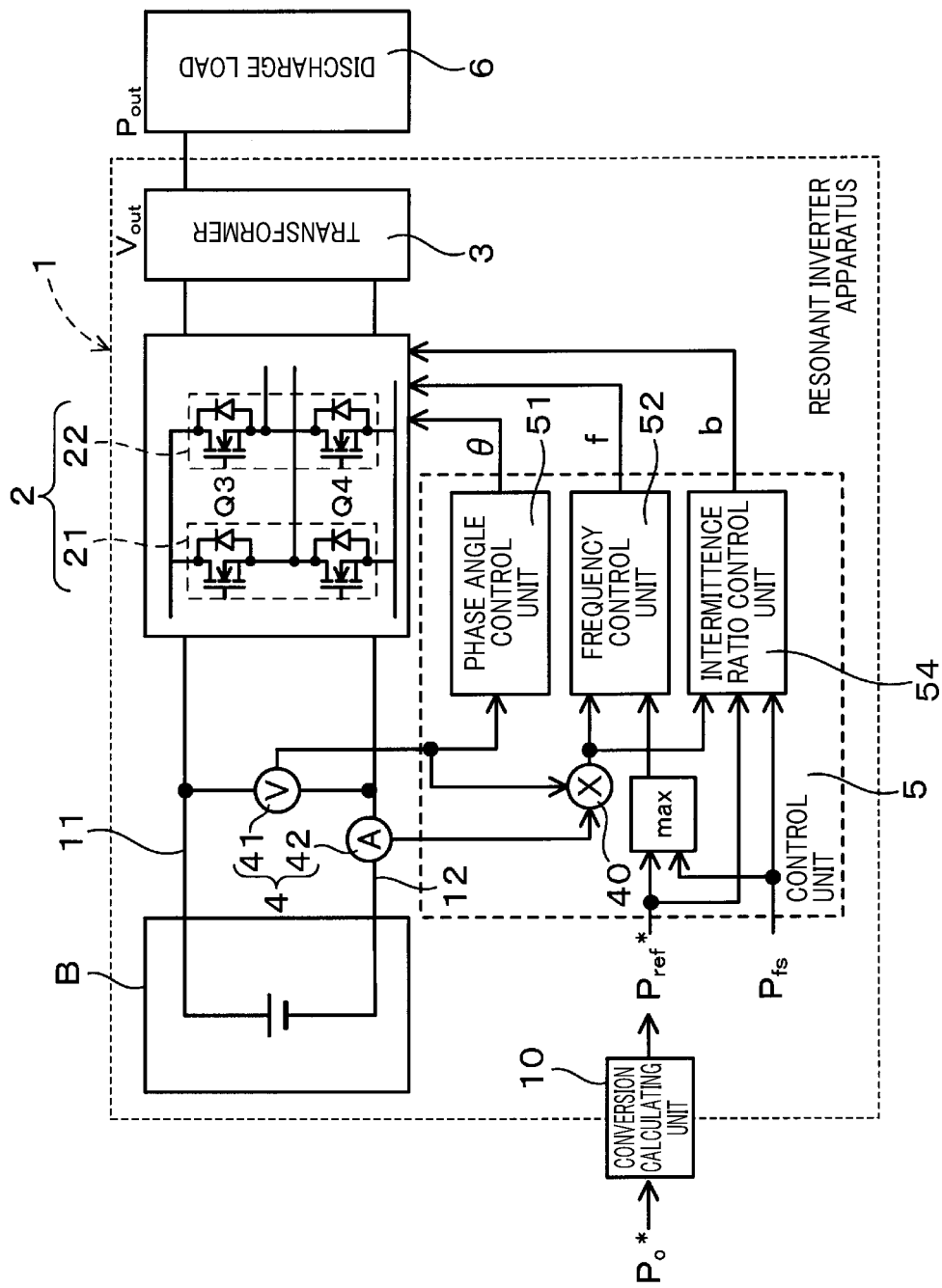
FIG. 19 is an overall schematic diagram of a resonant inverter apparatus according to a second embodiment.

In FIG. 19, a basic configuration of the resonant inverter apparatus 1 is similar to that according to the first embodiment. Differences will mainly be described below.

According to the present embodiment as well, the control unit 5 sets the SW phase angle θ based on the input voltage Vin in the phase angle control unit 51. The control unit 5 also sets the SW frequency f based on the target input power Pref* derived from the target output power Po* in the frequency control unit 52. Furthermore, at this time, the SW frequency f is set such that the target input power Pref* is equal to or greater than a discharge start power Pfs. The discharge start power Pfs is a lower limit value of the input power Pin that can enable the discharge load 6 to generate discharge.

Figure 20:
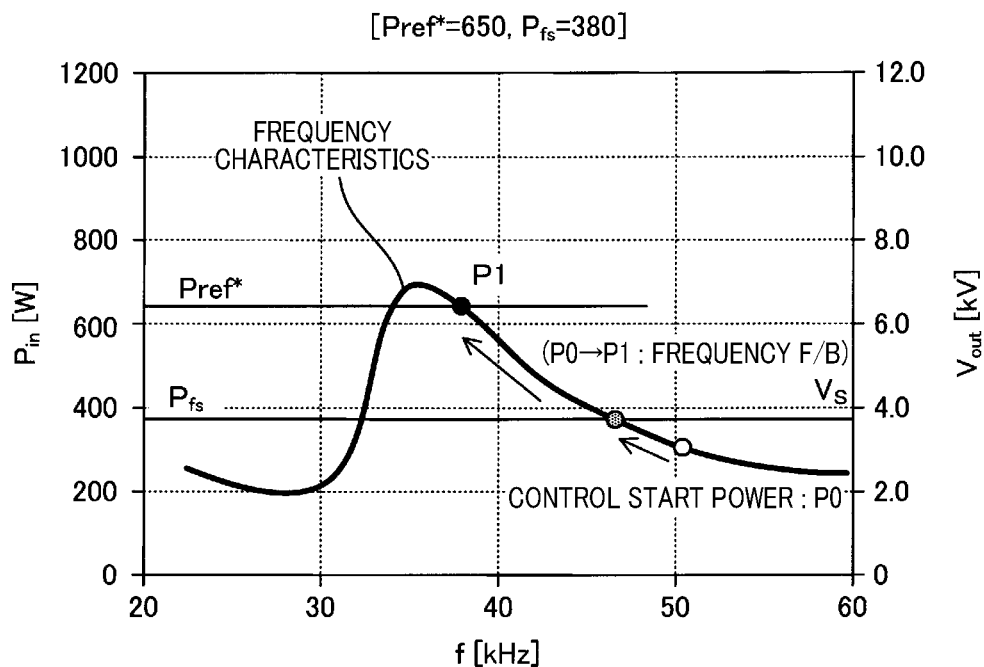
FIG. 20 is a diagram for explaining an overview of control performed by the resonant inverter apparatus according to the second embodiment, the diagram being a characteristics diagram of a relationship between input power, output power, and frequency.

As shown in FIG. 20, to enable the discharge load 6 such as the discharge reactor to generate discharge, the output voltage Vout from the resonant inverter apparatus 1 is required to be controlled to be equal to or greater than a discharge start voltage Vs. The discharge start voltage Vs is a lowest voltage at which discharge can be started. That is, discharge starts only when the output voltage Vout reaches the discharge start voltage Vs. Therefore, the input power Pin that corresponds to the discharge start voltage Vs is defined as the discharge start power Pfs that is a lowest power at which discharge can be started. Control is performed such that the input power Pin at the start of discharge is equal to or greater than the discharge start power Pfs.

Information on the discharge start power Pfs is preferably inputted together with the target input power Pref* to the frequency control unit 52. First, from a control start power P0 that is set in advance, the frequency f is gradually decreased and set to the SW frequency f that corresponds to the discharge start power Pfs (for example, Pfs=380 W). Furthermore, when the target input power Pref* (for example, Pref*=650 W) is higher than the discharge start power Pfs, feedback control of the SW frequency f is continued in continuation mode in which the inverter circuit 2 is continuously driven, and the input power Pin is brought closer to the target input power Pref*. For example, the control start power P0 corresponds to a maximum frequency fmax (such as about 50 kHz) that is prescribed in advance.

Figure 21:
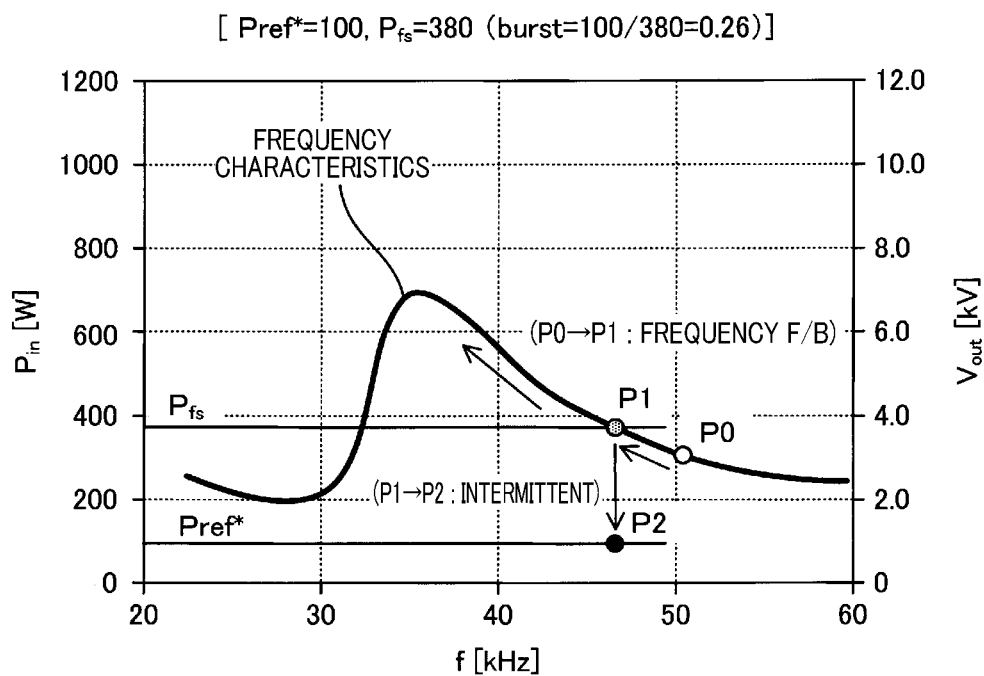
FIG. 21 is a characteristics diagram of a relationship between input power, output power, and frequency in intermittent mode of the resonant inverter apparatus according to the second embodiment.

Meanwhile, as shown in FIG. 21, when the target input power Pref* (for example, Pref*=100 W) is lower than the discharge start power Pfs, the inverter circuit 2 is intermittently driven in intermittent mode. The intermittence ratio control unit 54 sets the intermittence ratio b for the intermittent mode. In the intermittent mode, a discharge period Tdis and a stop period Tstop are alternately performed. In the discharge period Tdis, the inverter circuit 2 is driven and the discharge load 6 is made to generate discharge. In the stop period Tstop, the inverter circuit 2 is not driven and the discharge load 6 is not made to generate discharge.

The intermittence ratio b is expressed as a ratio (Tdis/Tburst) of the discharge period Tdis to an intermittence cycle Tburst. The intermittence cycle Tburst is a period that is a combination of the discharge period Tdis and the stop period Tstop. In the intermittent mode, the control unit 5 controls the switching operation such that the intermittence ratio b is a value (that is, a ratio of the target input power Pref* to the discharge start power Pfs) that is calculated using expression 3, below. The discharge start power Pfs is outputted from the inverter circuit 2 during the discharge period Tdis.

$$b = Pref*/Pfs \qquad \text{Expression 3:}$$

In this manner, according to the present embodiment, the control unit 5 includes the intermittence ratio control unit 54. Therefore, control to bring the output power Pout closer to the target input power Pref* while maintaining the discharge start power Pfs can be efficiently performed through switching between the continuous mode and the intermittent mode based on the target input power Pref*.

Here, the control unit 5 according to the above-described first embodiment can also be configured such that the target input power Pref* and the discharge start power Pfs are inputted to the frequency control unit 52. The SW frequency f can then be controlled such that the output power Pout at the start of discharge is equal to or greater than the discharge start power Pfs.

Third Embodiment

Next, a resonant inverter apparatus according to a third embodiment will be described with reference to FIG. 22 to FIG. 24.

A basic configuration of the resonant inverter apparatus according to the present embodiment is similar to that according to the above-described second embodiment. The configurations of the inverter circuit 2 and the transformer 3 are partially modified. Furthermore, the control unit 5 includes a deriving unit (efficiency calculation unit) 55 that derives circuit efficiency η. Differences will mainly be described below.

Figure 22:
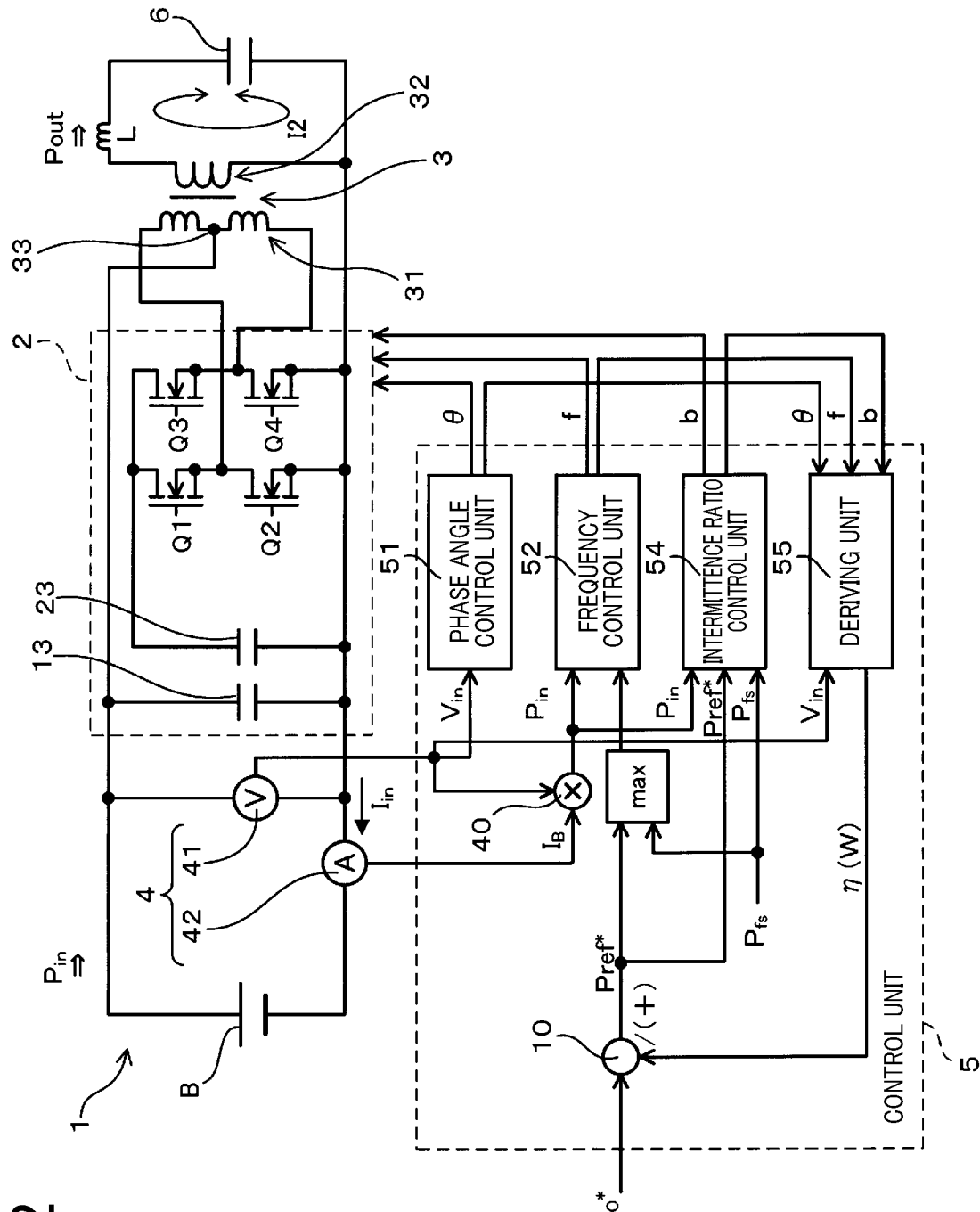
FIG. 22 is an overall schematic diagram of a resonant inverter apparatus according to a third embodiment.

As shown in FIG. 22, according to the present embodiment as well, the control unit 5 sets the SW phase angle θ based on the input voltage Vin in the phase angle control unit 51. The control unit 5 also sets the SW frequency f so as to be equal to or greater than the discharge start power Pfs based on the target input power Pref* derived from the target output power Po* in the frequency control unit 52. Furthermore, the control unit 5 sets the intermittence ratio b based on the discharge start power Pfs and the target input power Pref* in the intermittence ratio control unit 54.

Information on the SW phase angle θ, the SW frequency f, and the intermittence ratio b set by the phase angel control unit 51, the frequency control unit 52, and the intermittence ratio control unit 54 is inputted to the deriving unit 55. The deriving unit 55 calculates the circuit efficiency η using the parameters θ, f, and b, and the input voltage Vin. The deriving unit 55 may calculate power loss W instead of the circuit efficiency η. The circuit efficiency η or the power loss W is inputted to the conversion calculating unit 10.

As described above, the target output power Po* is converted to the target input power Pref* using the circuit efficiency η in the conversion calculating unit 10. In addition, when the power loss W is used, the power loss W is added to the target output power Po* and the target input power Pref* is calculated. In this manner, the target input power Pref* is successively calculated through use of the circuit efficiency η or the power loss W that is calculated from the various parameters. As a result of the target input power Pref* being reflected in the control of the SW frequency f in the frequency control unit 52, a more accurate control of the output power Pout can be performed.

Furthermore, according to the present embodiment, a push-pull circuit and a resonant tank circuit are configured in the inverter circuit 2 and the transformer 3. Therefore, the primary coil 31 of the transformer 3 is configured to have a center tap 33 and is connected to a positive terminal of the filter capacitor 13. In addition, an auxiliary capacitor 23 is arranged in parallel with the first arm 21 and the second arm 22 of the inverter circuit 2. At this time, the push-pull circuit is configured by the filter capacitor 13, the transformer 3, and the switching elements Q2 and Q4. The resonant tank circuit is configured by the switching elements Q1 and Q3, and the auxiliary capacitor 23.

The control unit 5 alternately switches between a period in which the switching element Q2 of the first arm 21 is turned on and a period in which the switching element Q4 of the second arm 22 is turned on. At this time, a current generated as a result of discharge from the filter capacitor 13 or a current generated as a result of discharge from the auxiliary capacitor 23 flows to the positive-terminal side or the negative-terminal side of the primary coil 31. In addition, as a result of a current that is stored in the auxiliary capacitor 23 being supplied to flow in a direction in which the filter capacitor 13 is charged, load placed on the filter capacitor 13 can be reduced.

Next, the driving pulse generating process performed by the control unit 5 will be described with reference to FIG. 23A, FIG. 23B, and FIG. 24.

When the processes shown in flowcharts in FIG. 23A and FIG. 23B are started, first, at step S101, the control unit 5 receives the target input power Pref* that is transmitted from the conversion calculating unit 10. At subsequent step S102, the control unit 5 detects the input voltage Vin in the DC voltage detecting unit 41 and calculates the SW phase angle θ for the SW phase angle control. Next, the control unit 5 proceeds to step S103. The control unit 5 calculates the circuit efficiency η or the power loss W using the parameters θ, f, and b, and the input voltage Vin inputted to the deriving unit 55.

Then, the control unit 5 proceeds to step S104. The control unit 5 calculates the target input power Pref* using the input power Pin based on the input voltage Vin and the input current Iin from the power measuring unit 4. Furthermore, at step S105, the control unit 5 determines whether the target input power Pref* is equal to or greater than the discharge start power Pfs (that is, is Pref*≥discharge start power Pfs?). When determined Yes at step S105, the control unit 5 selects the continuous mode and proceeds to step S106. When determined No at step S105, the control unit 5 selects the intermittent mode and proceeds to step S107.

At step S107, the control unit 5 calculates the intermittence ratio b using the expression 3, as described above.

$$b=Pref^*/Pfs \qquad \text{Expression 3:}$$

Furthermore, at step S108, the control unit 5 calculates the SW frequency f and proceeds to step S109. Then, at step S109, the control unit 5 intermittently drives the inverter circuit 2 at the calculated intermittence ratio b, the SW frequency f, and the SW phase angle θ. The control unit 5 then returns to step S103.

Figure 24:
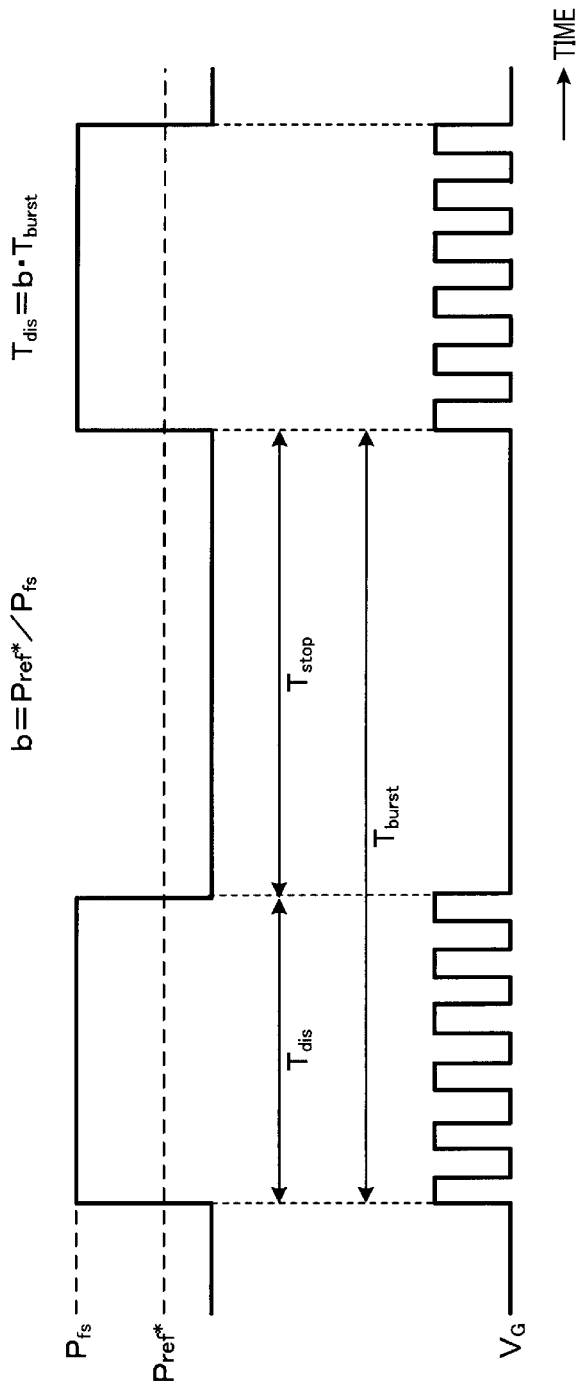
FIG. 24 is a diagram for explaining an overview of intermittence ratio control performed by the resonant inverter apparatus according to the third embodiment, the diagram being a waveform diagram of output power and gate voltage in the intermittent mode.

As shown in FIG. 24, in the intermittent mode, the discharge period Tdis and the stop period Tstop are alternately performed at the predetermined intermittence ratio b. In the discharge period Tdis, switching operation of the inverter circuit 2 is controlled at the predetermined SW frequency f and the SW phase angle θ.

Meanwhile, when the control unit 5 proceeds to step S106, the control unit 5 continuously drives the inverter circuit 2 at the calculated SW frequency f and SW phase angle θ in the intermittent mode. The control unit 5 then returns to step S103.

According to the present embodiment, the intermittent mode and the continuous mode are set in this manner. The inverter circuit 2 is thereby intermittently or continuously driven. As a result, at the start of the discharge period Tdis, discharge by electric power that is equal to or greater than the discharge start power Pfs is started with certainty. In addition, as a result of switching between the intermittent mode and the continuous mode being performed based on the target input power Pref*, the resonant inverter apparatus 1 can be efficiently controlled such that the desired output power Pout is acquired.

As described above, according to the above-described embodiments, even when the resonant inverter apparatus 1 is used in an environment in which the input voltage Vin varies, the effects on the output power Pout can be suppressed. The resonant inverter apparatus 1 in which loss is further reduced can be provided.

Here, according to the above-described embodiments, the resonant inverter apparatus 1 is mounted in a vehicle. However, the present disclosure is not limited thereto. The resonant inverter apparatus 1 can, of course, be used in applications other than onboard use. In addition, the configurations of the inverter circuit 2 and the transformer 3, and the like are not limited to those according to the above-described embodiments. Other configurations may be used.

The present disclosure is not limited to the above-described embodiments. Various embodiments are possible without departing from the spirit of the present disclosure.

What is claimed is:

1. A resonant inverter apparatus that supplies a high AC voltage to a discharge load, the resonant inverter apparatus comprising:
    a DC voltage power supply that outputs a DC voltage;
    an inverter circuit that converts the outputted DC voltage to an AC voltage by on/off switching of a plurality of switching elements;
    a transformer that steps up the converted AC voltage and generates the high AC voltage;
    a DC voltage detecting unit that detects a value of the DC voltage that is supplied from the DC voltage power supply to the inverter circuit; and
    a control unit that generates a driving pulse for performing the on/off switching of each of the plurality of the switching elements, wherein
    the plurality of switching elements include at least one first switching element and at least one second switching element other than the at least one first switching element, and
    the control unit includes a phase angle control unit that performs phase angle control of the driving pulse, the phase angle control unit setting a switching phase angle of the second switching element relative to the first switching element that serves as reference, based on a magnitude of the value of the DC voltage, in response to the value of the DC voltage detected by the DC voltage detecting unit being greater than a reference value.

2. The resonant inverter circuit according to claim 1, wherein:
    the inverter circuit is configured by a first arm and a second arm being connected in parallel, the first arm including the first switching element configured by a pair of switching elements and a center point connected to a first end of a primary coil of the transformer, the second arm including the second switching element configured by a pair of switching elements and a center point connected to a second end of the primary coil of the transformer;

the control unit generates the driving pulse such that, during a single control cycle, the first arm and the second arm are alternately turned on/off, and a first switching element of the pair of switching elements in each arm is turned off, in response to a second switching element being turned on; and the phase angle control unit sets, as the switching phase angle, an amount of shifting towards a delay-angle side of the driving pulse that is outputted to the second arm, relative to the driving pulse that is outputted to the first arm that serves as reference.

3. The resonant inverter apparatus according to claim 2, wherein the DC voltage power supply is an onboard battery; and the phase angle control unit performs feed-forward control of the switching phase angle that is set at each control cycle based on the DC voltage value.

4. The resonant inverter apparatus according to claim 3, wherein:

the control unit further includes a frequency control unit that sets a switching frequency of the driving pulse based on a target input power that is a target value of input power that is inputted to the inverter circuit.

5. The resonant inverter apparatus according to claim 4, wherein the frequency control unit sets the switching frequency such that the target input power is equal to or greater than a discharge start power that is a lower limit value of input power that enables the discharge load to generate discharge.

6. The resonant inverter apparatus according to claim 5, wherein:

the control unit includes a continuous mode and an intermittent mode, wherein in the continuous mode, the control unit controls the inverter circuit to be continuously driven so as to enable the discharge load to continuously generate discharge, in response to the target input power being equal to or greater than the discharge start power, and in the intermittent mode, the control unit controls the inverter circuit to alternately repeat a discharge period and a stop period so as to enable the discharge load to intermittently generate discharge, in response to the target input power being less than the discharge start power, wherein in the discharge period, the inverter circuit is driven, and in the stop period, the inverter circuit is not driven.

7. The resonant inverter apparatus according to claim 6, wherein:

the control unit further includes an intermittence ratio control unit that sets, in the intermittent mode, an intermittence ratio that is a ratio of the discharge period to an intermittence cycle that is a combination of the discharge period and the stop period.

8. The resonant inverter apparatus according to claim 2, wherein:

the control unit further includes a frequency control unit that sets a switching frequency of the driving pulse based on a target input power that is a target value of input power that is inputted to the inverter circuit.

9. The resonant inverter apparatus according to claim 1, wherein:

the control unit further includes a frequency control unit that sets a switching frequency of the driving pulse based on a target input power that is a target value of input power that is inputted to the inverter circuit.

* * * * *